United States Patent
Sun et al.

(10) Patent No.: US 10,412,733 B2
(45) Date of Patent: Sep. 10, 2019

(54) FEEDBACK-BASED RETRANSMISSION USING MIXED-DURATION TRANSMISSION TIME INTERVALS

(71) Applicant: QUALCOMM Incorporated, San Diego, CA (US)

(72) Inventors: Jing Sun, San Diego, CA (US); Seyedkianoush Hosseini, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/710,698

(22) Filed: Sep. 20, 2017

(65) Prior Publication Data

US 2018/0242315 A1    Aug. 23, 2018

Related U.S. Application Data

(60) Provisional application No. 62/460,731, filed on Feb. 17, 2017.

(51) Int. Cl.
*H04W 72/04* (2009.01)
*H04L 1/18* (2006.01)

(52) U.S. Cl.
CPC ....... *H04W 72/0446* (2013.01); *H04L 1/1861* (2013.01); *H04L 1/1887* (2013.01);
(Continued)

(58) Field of Classification Search
CPC ....... H04L 1/18; H04L 1/1861; H04L 1/1887; H04L 1/1893; H04L 1/12; H04L 1/1822;
(Continued)

(56) References Cited

U.S. PATENT DOCUMENTS 7,853,262 B2 * 12/2010 Cheon ..................... H04L 47/10
  370/310
9,629,066 B2 * 4/2017 Au ......................... H04W 48/00
(Continued)

FOREIGN PATENT DOCUMENTS

KR    20120061504 A    6/2012

OTHER PUBLICATIONS

International Search Report and Written Opinion—PCT/US2018/018334—ISA/EPO—dated May 30, 2018.
(Continued)

*Primary Examiner* — Tri H Phan
(74) *Attorney, Agent, or Firm* — Holland & Hart LLP

(57) ABSTRACT

Techniques are described that provide for generation of a first transport block (TB) that includes a number of code blocks (CBs) that are transmitted to a receiver during a first transmission time interval (TTI) having a first duration, and retransmission of any unsuccessfully received CBs in a second TTI having a duration that is selected from multiple available TTI durations. The second TTI may have a second TTI duration that is shorter than the first TTI duration, and may have CBs only from the first TB. One or more of a time duration or frequency resources of the second TTI may be selected based on the number of CBs that are retransmitted in the second TTI.

30 Claims, 16 Drawing Sheets

(52) U.S. Cl.
CPC ......... *H04L 1/1893* (2013.01); *H04W 72/042* (2013.01); *H04L 1/1822* (2013.01); *H04L 1/1845* (2013.01)

(58) Field of Classification Search
CPC .. H04L 1/1845; H04W 72/04; H04W 72/042; H04W 72/0446
See application file for complete search history.

(56) References Cited

U.S. PATENT DOCUMENTS

| | | | |
|---|---|---|---|
| 10,091,117 B2* | 10/2018 | Sun | H04L 47/25 |
| 2007/0201404 A1 | 8/2007 | Cheon et al. | |
| 2015/0305058 A1 | 10/2015 | Hammarwall et al. | |
| 2016/0249329 A1 | 8/2016 | Au et al. | |
| 2016/0269150 A1 | 9/2016 | Jiang et al. | |
| 2017/0048886 A1 | 2/2017 | Sun et al. | |
| 2018/0034596 A1* | 2/2018 | Noh | H04L 1/0009 |
| 2018/0048421 A1* | 2/2018 | Yeo | H04L 1/0046 |
| 2018/0145797 A1* | 5/2018 | Yeo | H04L 1/1812 |
| 2018/0234880 A1* | 8/2018 | Jiang | H04L 1/0045 |
| 2018/0234881 A1* | 8/2018 | Hosseini | H04W 28/04 |
| 2019/0020444 A1* | 1/2019 | Froberg Olsson | H04L 1/1854 |

OTHER PUBLICATIONS

NTT Docomo., et al., "Views on HARQ Enhancements for NR", 3GPP Draft; R1-1702815, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017, Feb. 12, 2017 (Feb. 12, 2017), XP851289968, 4 pages, Retrieved from the Internet: URL: http://www.3gpp.org/ftp/Meetings_3GPP_SYNC/RAN1/Docs/ [retrieved on 2817-82-12].

Samsung: "CB-Group Based Retransmission for eMBB", 3GPP Draft; R1-1702990—CBG-Based Retransmission for EMBB. 3rd Generation Partnership Project (3GPP), Mobile Competence Centre; 650, Route Des Lucioles; F-06921 Sophia-Antipolis Cedex: France, vol. RAN WG1, No. Athens, Greece; Feb. 13, 2017-Feb. 17, 2017, Feb. 12, 2017 (Feb. 12, 2017), XP051210132, 9 pages, Retrieved from the Internet: URL: http://www.3gpp.org/ftp/Meetings_3GPP_SYNC/RAN1/Docs/ [retrieved on Feb. 12, 2017].

* cited by examiner

FEEDBACK-BASED RETRANSMISSION USING MIXED-DURATION TRANSMISSION TIME INTERVALS

CROSS REFERENCES

The present Application for Patent claims priority to U.S. Provisional Patent Application No. 62/460,731 by Sun, et al., entitled "Feedback-Based Retransmission Using Mixed-Duration Transmission Time Intervals," filed Feb. 17, 2017, assigned to the assignee hereof.

BACKGROUND

The following relates generally to wireless communication, and more specifically to feedback-based retransmission using mixed-duration transmission time intervals.

Wireless multiple-access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use orthogonal frequency division multiple access (OFDMA) on the downlink, single-carrier frequency division multiple access (SC-FDMA) on the uplink, and multiple-input multiple-output (MIMO) antenna technology.

In some examples, a wireless multiple-access communication system may include a number of base stations, each simultaneously supporting communication for multiple communication devices, otherwise known as user equipments (UEs). In a LTE or LTE-Advanced (LTE-A) network, a set of one or more base stations may define an eNodeB (eNB). In other examples (e.g., in a new radio (NR) or 5G network), a wireless multiple access communication system may include a number of smart radio heads (RHs) in communication with a number of access node controllers (ANCs), where a set of one or more RHs, in communication with an ANC, defines a base station (e.g., an eNB or gNB). A base station may communicate with a set of UEs on downlink channels (e.g., for transmissions from a base station to a UE) and uplink channels (e.g., for transmissions from a UE to a base station).

A base station in some LTE or NR deployments may transmit to one or more UEs using different length transmission time intervals (TTIs) that may be selected based on a service that is being provided. In some examples, a reduced length TTI may support some low latency wireless services that provide low latency with high reliability for wireless transmissions of the low latency services. Reduced length TTIs may be a subset of a longer TTI such as a slot-TTI, and in some cases, low latency services using reduced length TTIs may puncture other services that may have longer TTIs. Such puncturing may result in portions of transmissions of the longer TTI service not being received at the receiver of the transmission.

SUMMARY

The described techniques relate to improved methods, systems, devices, or apparatuses that support feedback-based retransmissions using mixed-duration transmission time intervals (TTIs). Generally, the described techniques provide for generation of a first transport block (TB) that includes a number of code blocks (CBs) that are transmitted to a receiver during a first TTI having a first duration, and retransmission of any unsuccessfully received CBs in a second TTI having a duration that is selected from multiple available TTI durations. In some cases, the second TTI may have a duration that is shorter than the first TTI duration. The second TTI may have CBs only from the first TB, and the CBs may have a same hybrid automatic repeat request (HARQ) index. In some cases, a same HARQ process may be shared between the first TTI having the first TTI duration and the second TTI having the second TTI duration. In some cases, one or more of a time duration or frequency resources of the second TTI may be selected based on the number of CBs that are retransmitted in the second TTI.

A method of wireless communication is described. The method may include receiving a first transmission comprising at least a portion of a first TB, the first TB comprising a set of CBs transmitted in a first TTI having a first TTI duration, transmitting an indication that a subset of the set of CBs is unsuccessfully received, and receiving a retransmission of the subset of the set of CBs in a second TTI having a TTI duration that is selected from the first TTI duration or a second TTI duration that is shorter than the first TTI duration.

An apparatus for wireless communication is described. The apparatus may include means for receiving a first transmission comprising at least a portion of a first TB, the first TB comprising a set of CBs transmitted in a first TTI having a first TTI duration, means for transmitting an indication that a subset of the set of CBs is unsuccessfully received, and means for receiving a retransmission of the subset of the set of CBs in a second TTI having a TTI duration that is selected from the first TTI duration or a second TTI duration that is shorter than the first TTI duration.

Another apparatus for wireless communication is described. The apparatus may include a processor, memory in electronic communication with the processor, and instructions stored in the memory. The instructions may be operable to cause the processor to receive a first transmission comprising at least a portion of a first TB, the first TB comprising a set of CBs transmitted in a first TTI having a first TTI duration, transmit an indication that a subset of the set of CBs is unsuccessfully received, and receive a retransmission of the subset of the set of CBs in a second TTI having a TTI duration that is selected from the first TTI duration or a second TTI duration that is shorter than the first TTI duration.

A non-transitory computer readable medium for wireless communication is described. The non-transitory computer-readable medium may include instructions operable to cause a processor to receive a first transmission comprising at least a portion of a first TB, the first TB comprising a set of CBs transmitted in a first TTI having a first TTI duration, transmit an indication that a subset of the set of CBs is unsuccessfully received, and receive a retransmission of the subset of the set of CBs in a second TTI having a TTI duration that is selected from the first TTI duration or a second TTI duration that is shorter than the first TTI duration.

In some examples of the method, apparatus, and non-transitory computer-readable medium described above, the second TTI includes only the subset of the set of CBs of the first TB. Some examples of the method, apparatus, and non-transitory computer-readable medium described above may further include processes, features, means, or instructions for receiving, at least partially concurrently with the receiving the retransmission of the subset of the set of CBs, a second transmission comprising at least a portion of a second TB in a third TTI, the third TTI having the first TTI duration.

Some examples of the method, apparatus, and non-transitory computer-readable medium described above may further include processes, features, means, or instructions for identifying a RB allocation and the second TTI duration of the second TTI from a set of available RB allocations and a set of available TTI durations.

Some examples of the method, apparatus, and non-transitory computer-readable medium described above may be implemented at a base station, which may determine a number of CBs in the subset of the set of CBs to be retransmitted in the second TTI, determine the RB allocation and the second TTI duration based at least in part on the number of CBs, and transmit control information to a UE indicating the RB allocation and the second TTI duration to be used for the retransmission of the subset of the set of CBs.

In some examples of the method, apparatus, and non-transitory computer-readable medium described above, the control information may be transmitted in DCI that provides an uplink grant for the retransmission of the subset of the set of CBs.

Some examples of the method, apparatus, and non-transitory computer-readable medium described above may be implemented at a UE, which may receive control information that indicates the RB allocation and the second TTI duration. In some examples of the method, apparatus, and non-transitory computer-readable medium described above, the control information may be received in DCI that provides a downlink grant for the retransmission of the subset of the set of CBs.

In some examples of the method, apparatus, and non-transitory computer-readable medium described above, the receiving the retransmission further comprises receiving an indication that the retransmission may be responsive to the indication of the subset of the set of CBs and includes CBs only of the subset of the set of CBs, or that the retransmission includes the set of CBs.

In some examples of the method, apparatus, and non-transitory computer-readable medium described above, the retransmission of the subset of the set of CBs may have a same HARQ index as the first transmission. In some examples of the method, apparatus, and non-transitory computer-readable medium described above, a same HARQ process may be shared between the first TTI having the first TTI duration and the second TTI having the second TTI duration.

A method of wireless communication is described. The method may include transmitting a first transmission comprising at least a portion of a first TB, the TB comprising a set of CBs transmitted in a first TTI having a first TTI duration, receiving an indication that a subset of the set of CBs is unsuccessfully received, and transmitting a retransmission of the subset of the set of CBs in a second TTI having a TTI duration that is selected from the first TTI duration or a second TTI duration that is shorter than the first TTI duration.

An apparatus for wireless communication is described. The apparatus may include means for transmitting a first transmission comprising at least a portion of a first TB, the TB comprising a set of CBs transmitted in a first TTI having a first TTI duration, means for receiving an indication that a subset of the set of CBs is unsuccessfully received, and means for transmitting a retransmission of the subset of the set of CBs in a second TTI having a TTI duration that is selected from the first TTI duration or a second TTI duration that is shorter than the first TTI duration.

Another apparatus for wireless communication is described. The apparatus may include a processor, memory in electronic communication with the processor, and instructions stored in the memory. The instructions may be operable to cause the processor to transmit a first transmission comprising at least a portion of a first TB, the TB comprising a set of CBs transmitted in a first TTI having a first TTI duration, receive an indication that a subset of the set of CBs is unsuccessfully received, and transmit a retransmission of the subset of the set of CBs in a second TTI having a TTI duration that is selected from the first TTI duration or a second TTI duration that is shorter than the first TTI duration.

A non-transitory computer readable medium for wireless communication is described. The non-transitory computer-readable medium may include instructions operable to cause a processor to transmit a first transmission comprising at least a portion of a first TB, the TB comprising a set of CBs transmitted in a first TTI having a first TTI duration, receive an indication that a subset of the set of CBs is unsuccessfully received, and transmit a retransmission of the subset of the set of CBs in a second TTI having a TTI duration that is selected from the first TTI duration or a second TTI duration that is shorter than the first TTI duration.

In some examples of the method, apparatus, and non-transitory computer-readable medium described above, the second TTI includes only CBs of the first TB. Some examples of the method, apparatus, and non-transitory computer-readable medium described above may further include processes, features, means, or instructions for transmitting, at least partially concurrently with the transmitting the retransmission of the subset of the set of CBs, a second transmission comprising at least a portion of a second TB in a third TTI, the third TTI having the first TTI duration. Some examples of the method, apparatus, and non-transitory computer-readable medium described above may further include processes, features, means, or instructions for identifying a RB allocation and the second TTI duration of the second TTI from a set of available RB allocations and a set of available TTI durations.

Some examples of the method, apparatus, and non-transitory computer-readable medium described above may be implemented at a base station, which may determine a number of CBs in the subset of the set of CBs to be retransmitted in the second TTI, determine the RB allocation and the second TTI duration based at least in part on the number of CBs, and transmit control information to a UE indicating the RB allocation and the second TTI duration to be used for the retransmission of the subset of the set of CBs. In some examples of the method, apparatus, and non-transitory computer-readable medium described above, the control information may be transmitted in DCI that provides a downlink grant grant for the retransmission of the subset of the set of CBs.

Some examples of the method, apparatus, and non-transitory computer-readable medium described above, may be implemented at a UE, which may receive control information that indicates the RB allocation and the second TTI duration. In some examples of the method, apparatus, and non-transitory computer-readable medium described above, the control information may be transmitted in DCI that provides an uplink grant for the retransmission of the subset of the set of CBs.

In some examples of the method, apparatus, and non-transitory computer-readable medium described above, the transmitting the retransmission further comprises: transmitting an indication that the retransmission may be responsive to the indication of the subset of the set of CBs, and includes CBs only of the subset of the set of CBs.

In some examples of the method, apparatus, and non-transitory computer-readable medium described above, the retransmission of the subset of the set of CBs may have a same HARQ index as the first transmission. In some examples of the method, apparatus, and non-transitory computer-readable medium described above, a same HARQ process may be shared between the first TTI having the first TTI duration and the second TTI having the second TTI duration.

DETAILED DESCRIPTION

Figure 1:
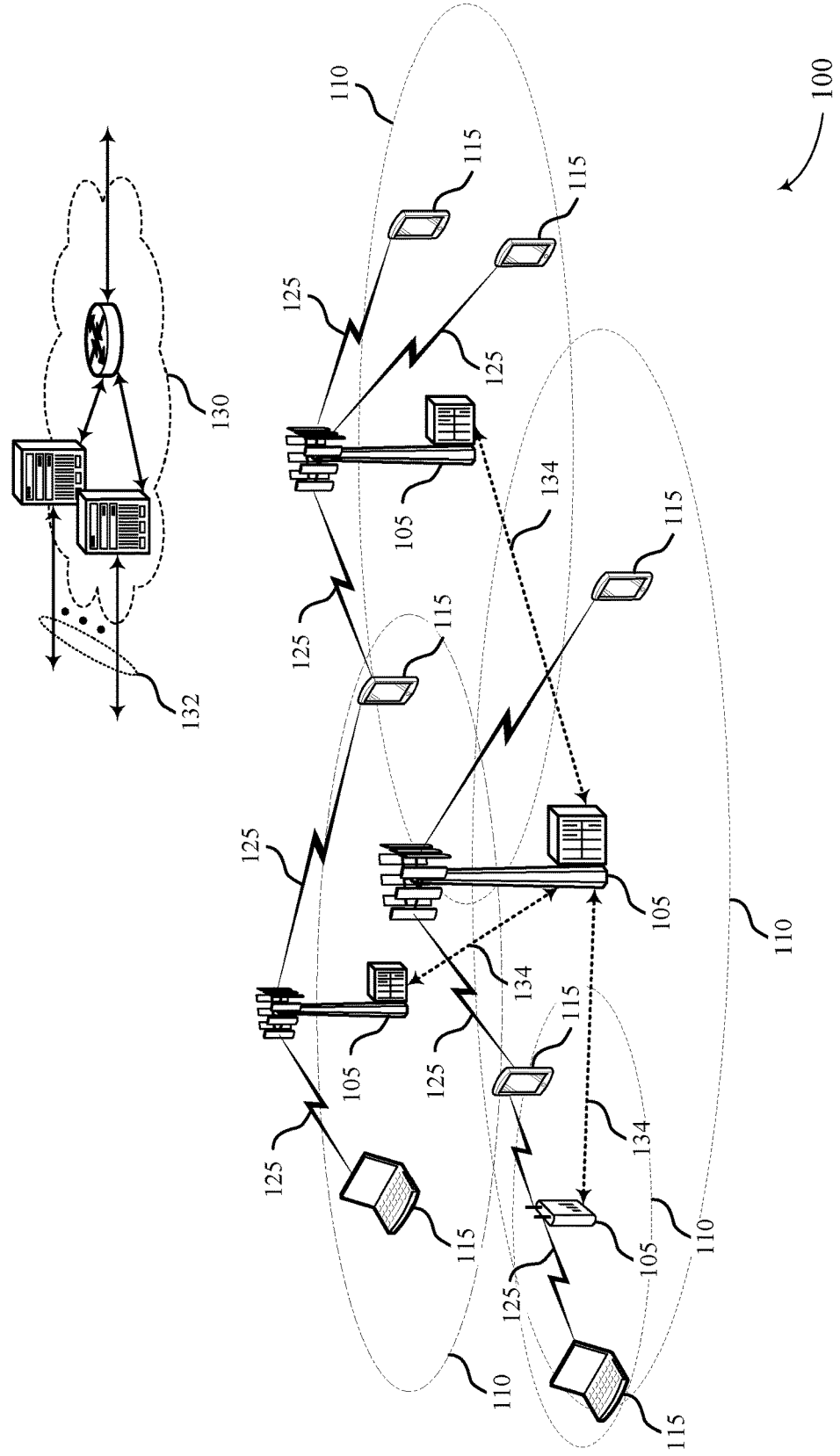
FIG. 1 illustrates an example of a system for wireless communication that supports feedback-based retransmission using mixed-duration transmission time intervals in accordance with aspects of the present disclosure.

The described techniques relate to improved methods, systems, devices, or apparatuses that support feedback-based retransmission using mixed-duration TTIs in wireless communications. In various examples, the described techniques provide for retransmissions of one or more CBs of a TB using a same or different duration TTI as used for the TB transmission. In some cases, the retransmission may include only CBs from the initially transmitted TB (e.g., may not include CBs from a subsequent TB). Alternatively, the retransmission may in some cases include CBs from the initially transmitted TB multiplexed with CBs of a subsequent TB. In some cases, a second TTI used for retransmissions may have a second TTI duration that is shorter than a first TTI duration of a TTI used for transmission of the TB. The second TTI may have CBs only from the first TB, and the CBs may have a same HARQ index and a same HARQ process may be shared between the first TTI having the first TTI duration and the second TTI having the second TTI duration. In some cases, one or more of a time duration or frequency resources of the second TTI may be selected based on the number of CBs that are retransmitted in the second TTI.

Resources allocated for wireless transmissions may be used for uplink and/or downlink communications that are relatively latency sensitive (referred to as low latency communications) relative to communications that may be relatively latency insensitive, such as enhanced mobile broadband (eMBB) transmissions that may use a 1 ms (or legacy LTE) TTI duration. In some cases, a TTI duration for wireless transmissions may correspond to one slot of a wireless subframe, one orthogonal frequency division multiplexing (OFDM) symbol, or multiple (e.g., 2, 3, 4, etc.) OFDM symbols. In some examples, a 1 ms TTI duration may correspond to a 1 ms subframe.

In some cases, wireless communications systems may use scalable TTI durations, and may provide for multiple different wireless services that may use different TTI durations based on latency requirements or quality of service (QoS) requirements of the service. Such different services may be selected depending upon the nature of the communications. For example, communications that require low latency and high reliability, sometimes referred to as mission critical (MiCr) communications, may be served through a lower-latency service (e.g., an ultra-reliable low-latency communication (URLLC) service) that uses reduced TTI durations (e.g., one-symbol or two-symbol TTIs). Alternatively, communications that are more delay-tolerant may be served through a service that provides relatively higher throughput with somewhat higher latency, such as a mobile broadband service (e.g., an eMBB service) that uses longer TTIs. In other examples, communications may be with UEs that are incorporated into other devices (e.g., meters, vehicles, appliances, machinery, etc.), and a machine-type communication (MTC) service (e.g., massive MTC (mMTC)) may be used for such communications. In some cases, different services (e.g., eMBB, URLLC, mMTC) may have different TTIs, different sub-carrier (or tone) spacing, different cyclic prefixes, etc.

The present disclosure describes various techniques with reference to networks designed to support features such as high bandwidth operations, more dynamic subframe/slot types, and self-contained subframe/slot types (e.g., in which HARQ feedback for a subframe/slot may be transmitted before the end of the subframe/slot). However, such techniques may be used for any system in which feedback may be provided for a portion of a TTI and retransmissions provided according to configured repetition levels that provide two or more retransmissions.

Aspects of the disclosure are initially described in the context of a wireless communications system. Various TTI structures and sets of resources are then described. Aspects of the disclosure are further illustrated by and described with reference to apparatus diagrams, system diagrams, and flowcharts that relate to feedback-based retransmission using mixed-duration TTIs for wireless communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE/LTE-A network, or a NR network. In some cases, wireless communications system 100 may support enhanced broadband communications, ultra-reliable (i.e., mission critical) communications, low latency communications, and communications with low-cost and low-complexity devices. Wireless communications system 100 may provide for wireless transmissions in which a transmitted TBs may be transmitted in a first TTI, and one or more CBs of the TB may be retransmitted in a second TTI that has a second TTI duration that is selected from a number of available TTI durations. Such techniques may allow for higher reliability transmissions and efficient system operation.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, an MTC device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105 or gNodeBs (gNBs) 105.

A base station 105 may be connected by an S1 interface to the core network 130. The core network may be an evolved packet core (EPC), which may include at least one mobile management entity (MME), at least one serving gateway (S-GW), and at least one packet gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The core network 130 may provide user authentication, access authorization, tracking, IP connectivity, and other access, routing, or mobility functions. At least some of the network devices, such as a base station 105 may include subcomponents such as an access network entity, which may be an example of an ANC. Each access network entity may communicate with a number of UEs 115 through one or more access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra high frequency (UHF) frequency region using frequency bands from 700 MHz to 2600 MHz (2.6 GHz), although in some cases wireless local area networks (WLANs) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a network device or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200\ T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, as discussed above, a TTI may be shorter than a subframe (e.g., a sTTI) or may be dynamically selected (e.g., in short TTI bursts or in selected component carriers using short TTIs).

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter transmission time interval (TTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power). In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable.

As indicated above, in some cases base stations 105 and UEs 115 may use feedback techniques in which an initial transmission and a subsequent retransmission may use mixed-duration TTIs. In some cases, all or a part of a TB may be transmitted during a first TTI that has a first TTI duration. The TB may have a number of CBs, and feedback (e.g., HARQ ACK/NACK feedback) may be provided on a CB-level. In some examples, a portion of the CBs of the TB may not be successfully received at a UE 115 or base station 105 that is receiving the transmission. For example, one or more symbols of the first TTI may be punctured by a lower-latency transmission, and CBs scheduled for transmission during such punctured symbols may not be transmitted.

The receiving UE 115 or base station 105 may provide feedback indicating the unsuccessfully received CBs, and the transmitting device may retransmit the missing CBs in a retransmission during a second TTI. In some cases, the second TTI may have a duration that is selected to be a same or different duration than the first TTI duration. In some cases, the retransmission may include only CBs from the initially transmitted TB. In some cases, a second TTI used for retransmissions may have a second TTI duration that is shorter than the first TTI duration, and that may be selected based at least in part on a number of CBs to be retransmitted. In some cases, the CBs of the second TTI may have a same HARQ index, and a same HARQ process may be shared between the first TTI and the second TTI. In some cases, one or more of a time duration or frequency resources of the second TTI may be selected based on the number of CBs that are retransmitted in the second TTI.

Figure 2:
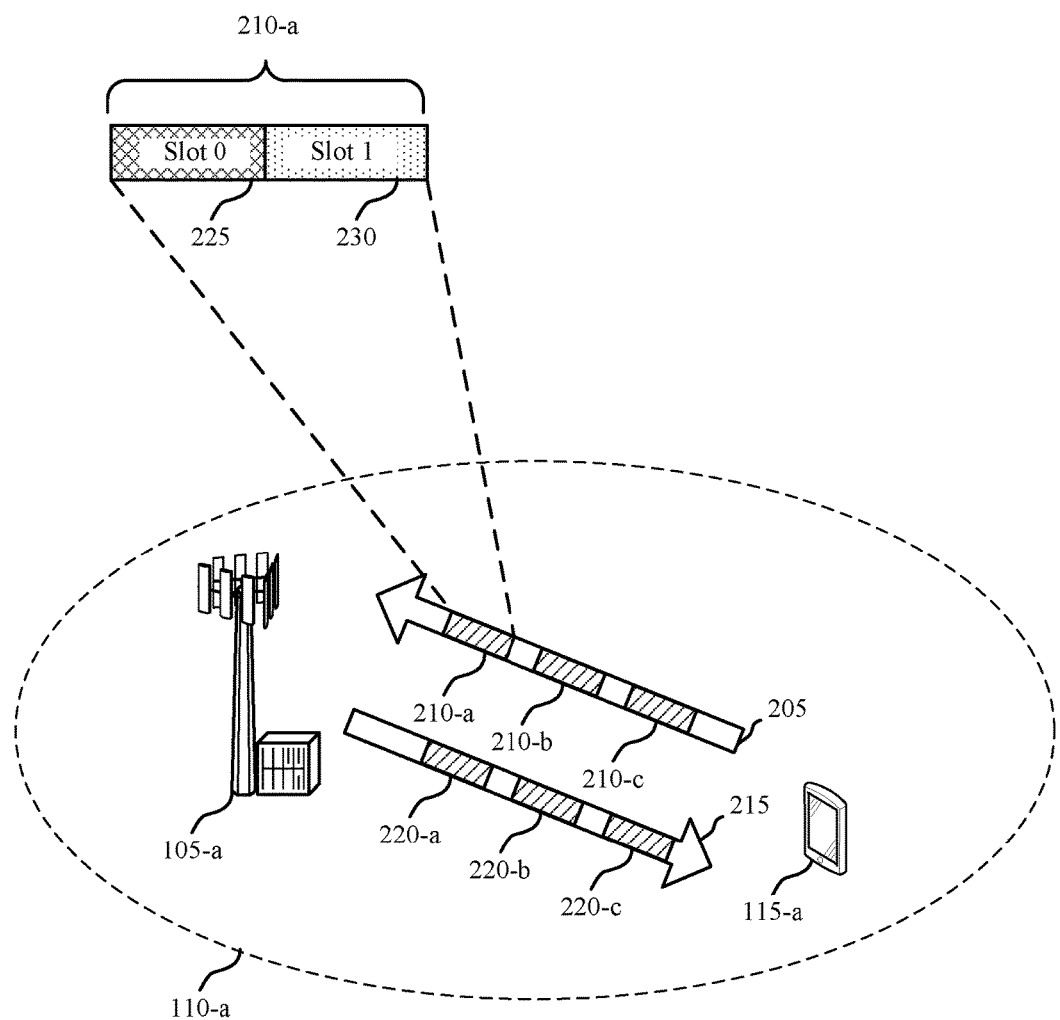
FIG. 2 illustrates an example of a wireless communications system that supports feedback-based retransmission using mixed-duration TTIs for wireless communications in accordance with aspects of the present disclosure.

FIG. 2 illustrates an example of a wireless communications system 200 that supports feedback-based retransmission using mixed-duration TTIs in accordance with various aspects of the present disclosure. Wireless communications system 200 includes a base station 105-a and a UE 115-a, which may be examples of aspects of a base station 105 or UE 115 as described above with reference to FIG. 1. In the example of FIG. 2, the wireless communications system 200 may operate according to a radio access technology (RAT) such as LTE, 5G, or NR, although techniques described herein may be applied to any RAT and to systems that may concurrently use two or more different RATs.

The base station 105-*a* may communicate with UE 115-*a*, and one or more other UEs within a coverage area 110-*a* of the base station 105-*a*, over an uplink carrier 205 and a downlink carrier 215. In some examples, the base station 105-*a* may allocate resources for communication with UEs over uplink carrier 205 and downlink carrier 215. For example, base station 105-*a* may allocate uplink resources 210 in uplink carrier 205 for uplink transmissions from UE 115-*a*, and may allocate downlink resources 220 in downlink carrier 215 for downlink transmissions from the base station 105-*a* to the UE 115-*a*. In some cases, one or more uplink resources 210 or downlink resources 220 may correspond to 0.5 ms transmission slots. In some cases, one or more uplink resources 210 or downlink resources 220 may correspond to a legacy LTE subframe having a TTI of 1 ms. In this example, uplink resources 210 may include a first uplink resource 210-*a*, a second uplink resource 210-*b*, and a third uplink resource 210-*c*. Each of the uplink resources 210 may include two slots, where each slot may have a number of OFDM symbols. In this example, a first slot 225 and a second slot 230 may be included in the first uplink resource 210-*a*. Downlink carrier 215 may have downlink resources 220-*a*, 220-*b*, 220-*c* allocated in a similar manner.

As indicated above, in the uplink of a low latency system, different TTI lengths may be used for transmissions over uplink carrier 205 and/or downlink carrier 220. For example, one-symbol TTI, two-symbol TTI, and 1-slot TTI durations may be supported for physical uplink control channel (PUCCH) and physical uplink shared channel (PUSCH) transmissions (e.g., and downlink channel transmissions). Thus, within first slot 225 or second slot 230, there may be multiple TTIs.

Figure 3:
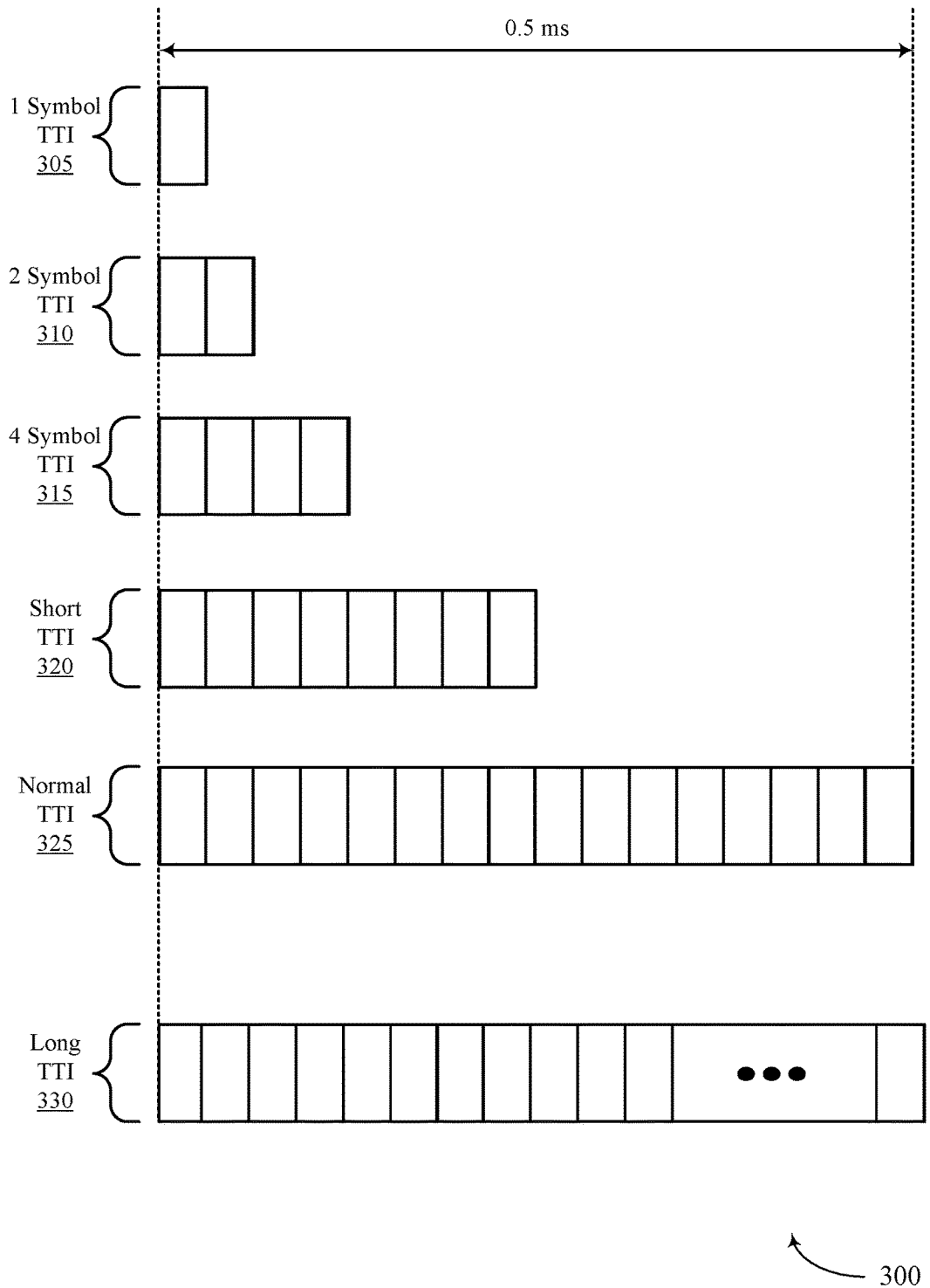
FIG. 3 illustrates an example of scalable TTIs that support feedback-based retransmission using mixed-duration TTIs for wireless communications in accordance with aspects of the present disclosure.

FIG. 3 illustrates an example of scalable TTIs 300 that support feedback-based retransmission in accordance with various aspects of the present disclosure. The scalable TTIs 300 may be used for communications between a UE 115 and a base station 105 as discussed above with respect to FIGS. 1 and 2. Various different configurations of TTIs may be implemented, in which TTIs may be arranged to be aligned with subframes or slots. Note that while the symbols illustrated in FIG. 3 are all illustrated as having a same length, depending on the numerology (e.g., subcarrier spacing) the symbol lengths could also be different. For example, 2 symbols under 30 kHz subcarrier spacing may have the same cumulative length as one symbol under 15 kHz subcarrier spacing. Thus, the examples provided in FIG. 3 are not necessarily to scale, and different symbol lengths may be used in some cases.

In some cases, such as NR deployments, scalable TTIs may be used for diverse latency, efficiency, and reliability requirements. For example, latency-sensitive services, such as MiCr or URLLC services, may use relatively short TTIs, such as a one-symbol TTI 305, a two-symbol TTI 310, a four-symbol TTI 315, or a short TTI 320 that corresponds to a duration of one-half of a 0.5 ms slot. In some cases, such services may have a high reliability requirement and a latency bound of less than 1 ms. Furthermore, services that may be relatively latency insensitive, such as eMBB services, may use relatively longer TTI durations, such as a four-symbol TTI 315, a short TTI 320, a normal TTI 325 that has a duration that corresponds to one 0.5 ms slot, or a long TTI 330 that may have a duration of 1 ms or longer. Services that use such longer TTI durations may provide relatively low average latency, relatively high spectrum efficiency, and high reliability within a more relaxed latency bound than MiCr or URLLC services. For example, in some cases TTI bundling may be used (e.g., to increase a coverage area associated with a given transmission by increasing the available transmission resources such that the data rate may be decreased).

In some examples, eMBB and MiCr services may be scheduled with different TTI durations to meet respective QoS requirements, and in some cases transmissions of these services may be multiplexed in the same time-frequency resource. In some cases, MiCr or URLLC services may use relatively wideband frequency resources to achieve relatively high capacity, and multiplexing between eMBB and MiCr may be used to achieve efficient resource utilization. As indicated above, URLLC or MiCr services may have priority over eMBB or higher-latency services, and transmissions of such lower latency services may in some cases puncture resource elements already allocated to eMBB transmissions. In some such situations some CBs of the eMBB service may be lost. Such puncturing may introduce bursty errors that impact a subset of symbols of a longer-duration TTI transmission. As indicated above, in some cases a first TTI may have a first TTI duration that may be 0.5 ms (e.g., a TTI of an eMBB transmission), and may carry all or a portion of a set of CBs that make up a TB. Thus, puncturing of the first TTI by a lower-latency transmission (e.g., a 2-symbol URLLC transmission) may result in a subset of the set of CBs not being transmitted.

Feedback may be provided (e.g., HARQ ACK/NACK feedback), in some examples, at the CB-level (e.g., rather than at the TB-level). CB-level ACK/NAK may thus help to improve the efficiency of retransmission, as the entire TB may not necessarily be retransmitted, and the receiving device (e.g., receiving UE or receiving base station) may report a list of CBs damaged or missing such that the transmitting device may only retransmit those CBs. The receiving device may then combine the retransmitted CBs with the previously successfully received CBs to generate the TB. In the event that relatively few CBs need to be retransmitted, designs that use the first duration TTI for transmissions of the first service may include the retransmitted CBs of the first TTI along with other CBs of another TB in the second TTI that has a same duration as the first TTI. In various examples of the present disclosure, the retransmitted CBs may be transmitted in a shorter duration TTI, and each of the CBs in the second TTI may be associated with the same TB as the first TTI. Thus, the second TTI in such cases would not include CBs from two or more different TBs, which may reduce processing complexity at both the transmitting device and the receiving device. In some cases, if a reduced duration TTI is selected for the retransmissions, the second TTI may use what may be referred to as a mini-slot structure instead of slot structure. In some cases, besides different TTI durations, RB allocations for retransmissions of CBs may be different. Accordingly, there are two dimensions (i.e., time and frequency) to adjust when selecting resources for retransmissions.

Figure 4:
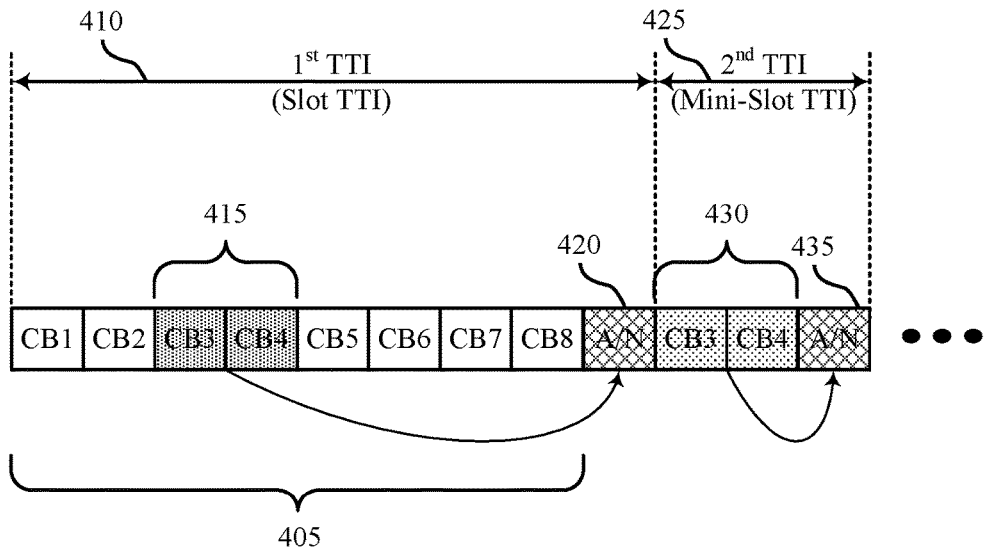
FIG. 4 illustrates an example of multiple TTIs with feedback-based retransmission using mixed-duration TTIs in accordance with aspects of the present disclosure.

FIG. 4 illustrates an example of multiple TTIs 400 that support feedback-based retransmission using mixed-duration TTIs in accordance with various aspects of the present disclosure. The TTIs 400 may be used for communications between a UE 115 and a base station 105 as discussed above with respect to FIGS. 1 and 2.

In this example, a transmitter (e.g., a UE 115 or a base station 105) may identify a TB 405 that is to be transmitted to a receiver during a first TTI 410. The first TTI 410 may be, for example, a slot TTI used for eMBB service transmissions. In some examples, the TB 405 may span multiple TTIs, and the first TTI 410 may include a portion of the TB 405. In the example of FIG. 4, a lower latency transmission, such as a URLLC transmission, may puncture the first TTI 410 and may result in puncturing of a subset of CBs 415. Accordingly, the CBs 415 may not be received. The receiver may provide ACK/NACK feedback 420 that may indicate, on a CB-level, that the subset of CBs 415 have not been successfully received. In the example of FIG. 4, the ACK/NACK feedback 420 is provided within the first TTI 410, which may be a self-contained slot TTI. However, in other examples, such feedback may be provided in a different TTI, based on HARQ timing and configured HARQ processes.

The transmitting device may receive the ACK/NACK feedback 420, and generate a retransmission of the missing subset of CBs 415. In the example of FIG. 4, the retransmission may be transmitted in a second TTI 425, which may have a TTI duration that is shorter than the first TTI 410 duration. In the example of FIG. 4, the second TTI 425 may be a mini-slot TTI that may be used to transmit eMBB traffic using a TTI duration that is shorter than the slot TTI duration, such as a two-symbol TTI. While the first TTI 410 and the second TTI 425 are illustrated in FIG. 4 as being consecutive TTIs, in other examples the second TTI 425 may be transmitted after one or more other intervening TTIs following the first TTI 410. The second TTI 425 may include a retransmitted subset of CBs 430, that may be retransmissions of the subset of CBs 415 that are missing from the TB 405. The receiving device may receive the retransmitted subset of CBs 430 and generate ACK/NACK feedback 435 that may be used to generate any further retransmissions that may be needed (e.g., or may indicate that no more retransmissions are needed).

Thus, the receiving device may report a list of CBs that fail decoding as ACK/NACK feedback 420 and 435, rather than providing a single TB level ACK/NACK feedback. The transmitting device that is transmitting TB 405 may receive the ACK/NACK feedback and package the requested CBs with proper redundancy version identification (RVID) in the retransmitted subset of CBs 430. As discussed above, the second TTI 425 in the example of FIG. 4 has a reduced duration TTI relative to the duration of the first TTI 410. In some examples, the transmitting device may select a duration of the second TTI 425. For example, if the TB 405 is transmitted as part of an eMBB service that uses slot TTIs, the retransmission may happen in either a normal slot or a mini-slot. If the retransmission is in a normal slot, a smaller RB allocation for the retransmitted subset of CBs 430 may be used. If the retransmission is in a mini-slot (e.g., a TTI having a duration that is shorter than a duration of the first TTI 410), resources may be allocated such that RB allocation and/or mini-slot length may be adjusted to provide the retransmitted subset of CBs 430.

In cases where a base station 105 is the transmitting device, the base station 105 may receive the ACK/NACK feedback 420, allocate resources for the second TTI 425, and indicate the allocated resources for the retransmission to the receiving UE 115 in downlink control information (DCI) transmitted to the UE that includes a downlink grant for the retransmission. In cases where a UE 115 is the transmitting device, a receiving base station may identify the subset of CBs 415 and may indicate a list of CBs for retransmission in an uplink resource allocation in an uplink DCI. The uplink DCI may be for a normal slot PUSCH transmission or a mini-slot PUSCH. Resources may be allocated in which RBs are selected when using a normal slot TTI duration, and resources may be allocated in which both RB allocations and mini-slot length may be adjusted when using a mini-slot TTI duration.

The retransmitted subset of CBs 430 may share a same HARQ index as the original transmission of the TB 405, and a same set of HARQ processes may be shared between transmissions in the first TTI 410 and the second TTI 425. In some examples, the second TTI 425 may be transmitted at least partially concurrently with a third transmission that may use a longer or same duration TTI as the second TTI. In some cases, where a base station is a transmitting device that transmits the TB 405 to a UE, a flag may be provided as part of retransmissions that may indicate whether the retransmission is triggered by a reception of ACK/NACK feedback 420 that lists the subset of CBs 415 or is triggered by something else, such as a time-based retransmission. A retransmission triggered by the ACK/NACK feedback 420 may include only a retransmission of the indicated subset of CBs 415, whereas a time-based retransmission may include a retransmission of the entire TB 405. The flag may indicate to the receiving UE the trigger for the retransmission, which may allow the UE to more efficiently process the retransmission. In cases where a shorter TTI duration is selected for the second TTI 425, the retransmission may be transmitted concurrently with a transmission of a different TB in an overlapping third TTI, which may use different frequency resources as the retransmission of the second TTI 425.

Figure 5:
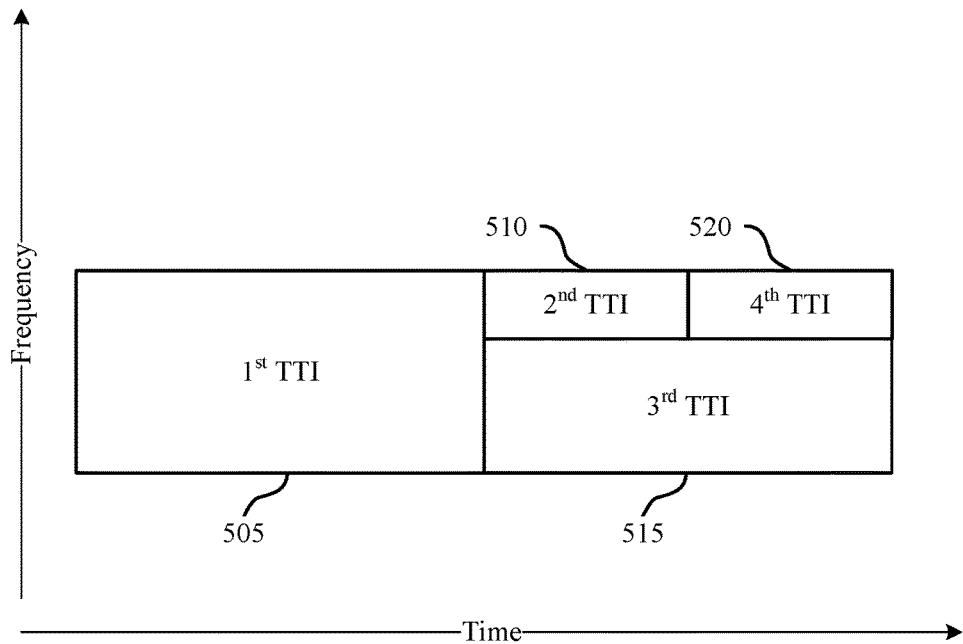
FIG. 5 illustrates an example of wireless resources that support feedback-based retransmission using mixed-duration TTIs for wireless communications in accordance with aspects of the present disclosure.

FIG. 5 illustrates an example of wireless resources 500 that support feedback-based retransmission using mixed-duration TTIs in accordance with various aspects of the present disclosure. Wireless resources 500 may be used for TB transmission, as well as feedback transmissions between a UE 115 and a base station 105 as discussed above with respect to FIGS. 1 and 2.

In the example of FIG. 5, a first TTI 505 may include time and frequency resources, and a transmission of at least a portion of CBs of a TB may be transmitted in the first TTI 505. As discussed above, in some cases a subset of CBs may not be successfully received at a receiver, and the subset of CBs may be retransmitted in accordance with CB-level HARQ processes. In some cases, retransmissions may use shorter duration TTIs. Additionally or alternatively, retransmissions may use a portion of available frequency resources. In the example of FIG. 5, a second TTI 510 may be used to retransmit one or more CBs that were unsuccessfully received in the first TTI 505. The second TTI 510 may use a shorter duration TTI than a first TTI duration of the first TTI 505, and may also have a RB allocation that spans fewer frequency resources than the first TTI 505. In this example, a third TTI 515 may occupy other available frequency resources and be transmitted at least partially concurrently with the second TTI 510. In this example, a fourth TTI 520 may also use a subset of available time and frequency resources. In such cases, a receiving device, such as a UE 115 or a base station 105, may receive shorter duration TTI transmissions concurrently with a longer TTI transmission, such as a mini-slot based retransmission transmitted in second TTI 510 and a normal slot based (re)transmission transmitted in third TTI 515. In such examples, using shorter TTI duration transmissions to deliver the retransmission may allow a shorter processing timeline (e.g., which may provide a shorter overall packet delivery for the wireless service).

In some cases, concurrent transmissions such as those illustrated in FIG. 5 may be used in both uplink and downlink transmissions. Such techniques may be used for uplink transmissions in cases where an OFDMA waveform is used. In cases where a single carrier waveform (e.g., SC-FDM or discrete Fourier transform-spread-OFDM (DFT-s-OFDM)) is used for uplink transmissions, such parallel transmissions may not be configurable at a UE 115, and retransmissions may be transmitted in a TDM manner with other transmissions of other TTIs.

Figure 6:
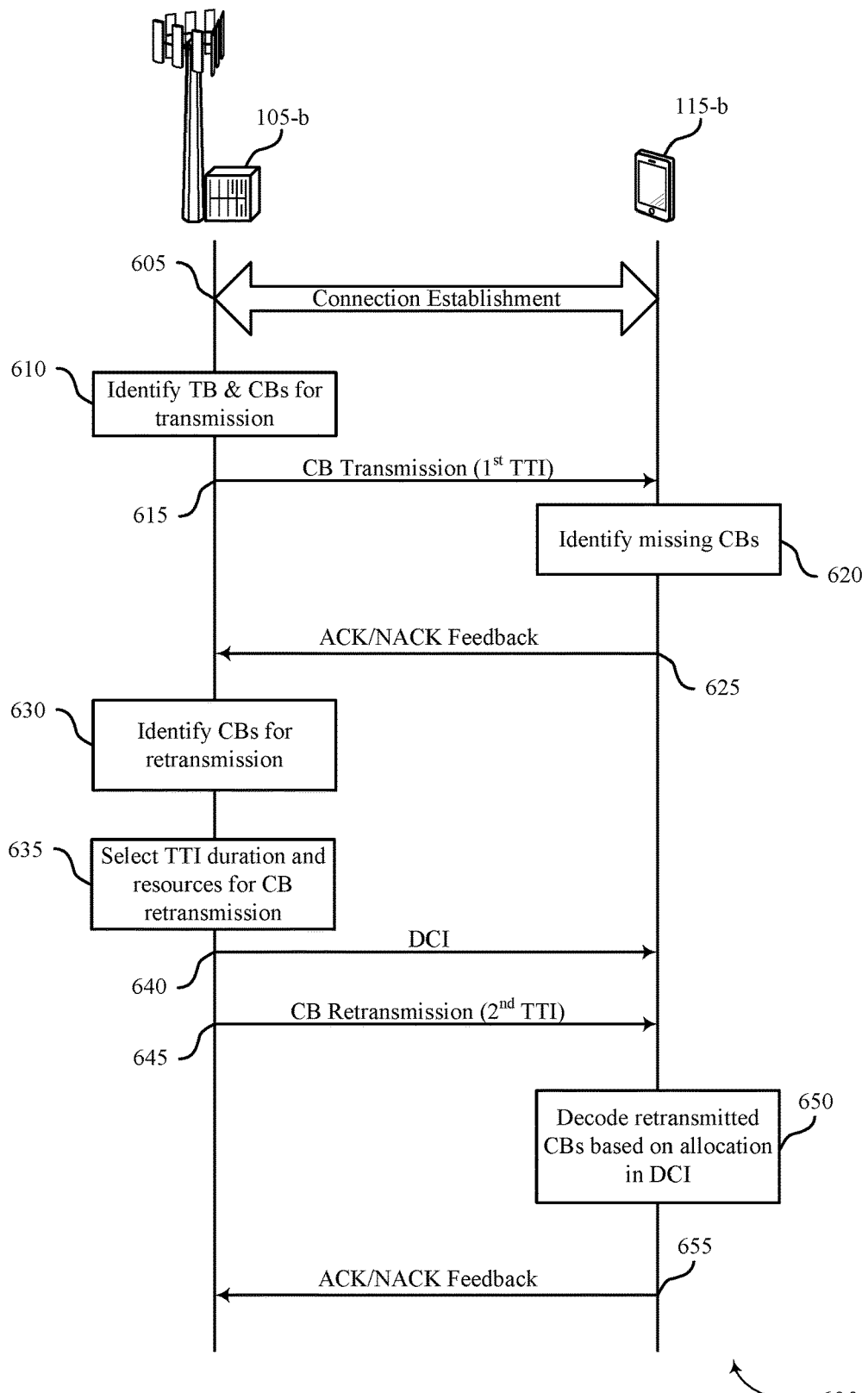
FIG. 6 illustrates an example of a process flow that supports feedback techniques for wireless communications in accordance with aspects of the present disclosure.

FIG. 6 illustrates an example of a process flow 600 that supports feedback-based retransmission using mixed-duration TTIs in accordance with various aspects of the present disclosure. Process flow 600 may include a base station 105-b, and a UE 115-b, which may be examples of the corresponding devices described with reference to FIGS. 1 and 2. The example of FIG. 6 illustrates a downlink transmission in which base station 105-b is a transmitting device that transmits a TB to UE 115-b. Similar techniques for uplink transmissions are discussed in more detail below.

Base station 105-b and UE 115-b may establish a connection at 605 according to connection establishment techniques for the wireless communications system. At 610, base station 15-b may identify a TB and CBs for transmission to UE 115-b. Base station 105-b may transmit a downlink transmission 615 with at least a portion of the CBs in a first TTI that has a first TTI duration.

At 620, UE 115-b may identify a number of missing CBs from the downlink transmission 615. The missing CBs may be identified, for example, based on CBs that are unsuccessfully decoded at UE 115-b. UE 115-b may transmit feedback at 625, which may include CB-level ACK/NACK information to base station 105-b based on the missing CBs. At 630, base station 105-b may identify a subset of CBs that are to be retransmitted to UE 115-b. The subset of CBs may be identified based on the CB-level ACK/NACK received from UE 115-b at 625, for example.

At 635, base station 105-b may select a TTI duration and resources for CB retransmission. In some examples, the resources may be selected to provide the retransmission using a shorter duration TTI than the first TTI duration. For example, the TB may be a TB of an eMBB service that is transmitted in a slot TTI, and either a slot TTI or a mini-slot TTI may be available for the retransmission of the subset of CBs. Base station 105-b may select either the slot TTI or the mini-slot TTI for the retransmission. Such a selection may be made, for example, based on a number of CBs to be retransmitted, other traffic that is present at base station 105-b, channel conditions, or combinations thereof. In some cases, base station 105-b may also select RBs that span a subset of available frequency resources for the retransmission, and may allocate other RBs for a third TTI transmission. Base station 105-b may provide the resource allocation for retransmission of the subset of CBs in a downlink grant that is indicated in DCI at 640 that may be transmitted to the UE 115-b. Base station 105-b may then transmit the CB retransmission 645 in a second TTI. As indicated above, the second TTI may have a different TTI duration than the first TTI duration.

At 650, UE 115-b may decode the retransmitted CBs based on the allocated resources indicated in the DCI at 640. UE 115-b may combine the decoded CBs with other received CBs of the TB and decode the entire TB. UE 115-b may transmit ACK/NACK feedback at 655 that may indicate that the TB is successfully received, or that may indicate that one or more CBs are to be retransmitted.

Figure 7:
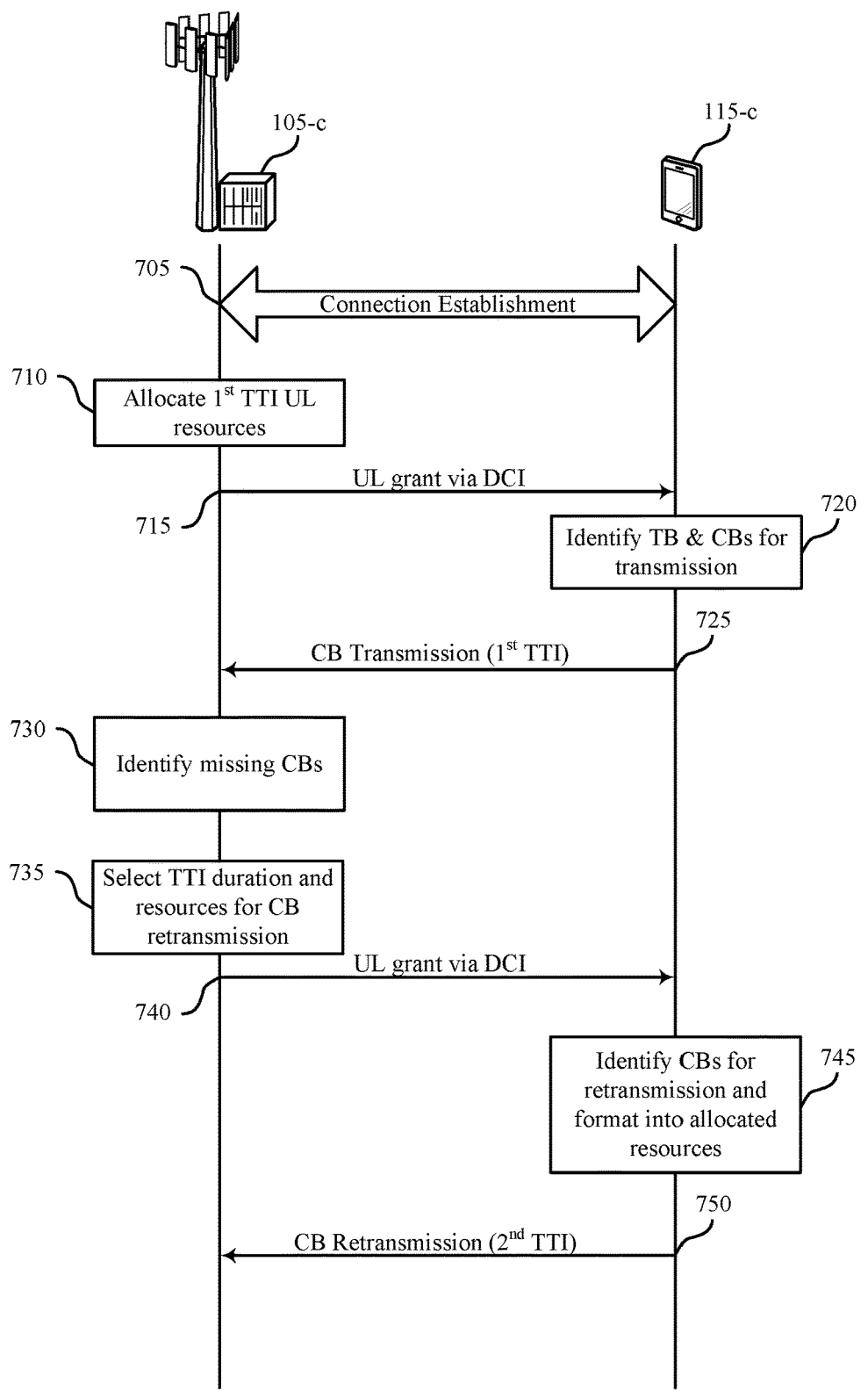
FIG. 7 illustrates an example of another process flow that supports feedback techniques for wireless communications in accordance with aspects of the present disclosure.

FIG. 7 illustrates an example of a process flow 700 that supports feedback-based retransmission using mixed-duration transmission time intervals in accordance with various aspects of the present disclosure. Process flow 700 may include a base station 105-c and a UE 115-c, which may be examples of the corresponding devices described with reference to FIGS. 1 and 2. The example of FIG. 7 illustrates an uplink transmission in which UE 115-c is a transmitting device that transmits a TB to base station 105-c.

Base station 105-c and UE 115-c may establish a connection at 705 according to connection establishment techniques for the wireless communications system. At 710, base station 105-c may allocate resources for a first TTI uplink transmission from UE 115-c to base station 105-c. Base station 105-c may transmit an uplink grant via DCI at 715 to UE 115-c that indicates allocated uplink resources.

At 720, UE 115-c may identify a TB and CBs for transmission to base station 105-c. UE 115-c may format at least a portion of the CBs for transmission using the uplink resources provided in the DCI at 715. UE 115-c may transmit the uplink transmission at 725 with at least a portion of the CBs in a first TTI that has a first TTI duration. At 730, base station 105-c may identify a number of missing CBs from the uplink transmission received at 725. The missing CBs may be identified, for example, based on CBs that are unsuccessfully decoded at base station 105-c, and base station 105-c may identify a subset of CBs that are to be retransmitted.

At 735, base station 105-c may select a TTI duration and resources for CB retransmission. In some examples, the resources may be selected to provide the retransmission using a shorter duration TTI than the first TTI duration. For example, the TB may be a TB of an eMBB service that is transmitted in a slot TTI, and either a slot TTI or a mini-slot TTI may be available for the retransmission of the subset of CBs. Base station 105-c may select either the slot TTI or the mini-slot TTI for the retransmission. Such a selection may be made, for example, based on a number of CBs to be retransmitted, other traffic that is present at base station 105-c, channel conditions, or combinations thereof. In some cases, base station 105-c may also select RBs, in addition to or instead of selection of a TTI duration. For example, the set of RBs may span a subset of available frequency resources for the retransmission. Base station 105-c may allocate other RBs for a third TTI transmission. Base station 105-c may provide the resource allocation for retransmission of the subset of CBs, and an indication of CBs that are to be retransmitted, in an uplink grant that transmitted via DCI at 740 that may be transmitted to UE 115-c.

At 745, UE 115-c may identify CBs for retransmission based on the uplink grant transmitted via DCI at 740, and may format the CBs into the allocated resources for retransmission. UE 115-c may then retransmit the subset of CBs in retransmission at 750 in the second TTI.

Figure 8:
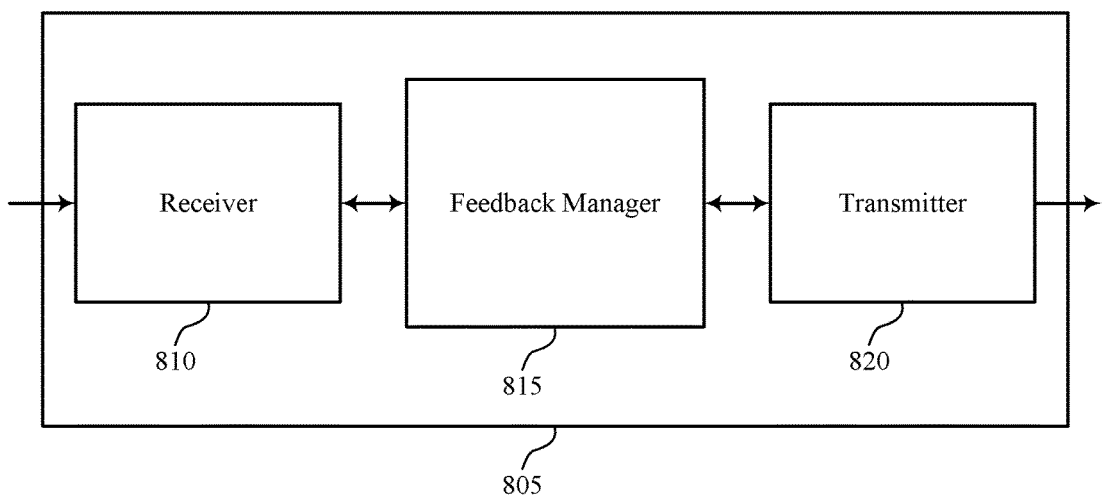
FIGS. 8 through 10 show block diagrams of a device that supports feedback-based retransmission using mixed-duration transmission time intervals in accordance with aspects of the present disclosure.

FIG. 8 shows a block diagram 800 of a wireless device 805 that supports feedback-based retransmission using mixed-duration TTIs in accordance with various aspects of the present disclosure. Wireless device 805 may be an example of aspects of a UE 115 or base station 105 as described with reference to FIG. 1. Wireless device 805 may include receiver 810, feedback manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to feedback-based retransmission using mixed-duration transmission time intervals, etc.). Information may be passed on to other components of the device. The receiver 810 may be an example of aspects of the transceiver 1135 described with reference to FIG. 11 or transceiver 1235 described with reference to FIG. 12. Receiver 810 may receive transmissions that may be transmitted using various TTIs, such as discussed above. In some cases, a first transmission may be received at least partially concurrently with a transmission or retransmission of a second transmission, using different frequency resources, for example.

Feedback manager 815 may be an example of aspects of the UE feedback manager 1115 described with reference to FIG. 11, or the base station feedback manager 1215 described with reference to FIG. 12. Feedback manager 815 and/or at least some of its various sub-components may be implemented in hardware, software executed by a processor, firmware, or any combination thereof. If implemented in software executed by a processor, the functions of the feedback manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The feedback manager 815 and/or at least some of its various sub-components may be physically located at various positions, including being distributed such that portions of functions are implemented at different physical locations by one or more physical devices. In some examples, feedback manager 815 and/or at least some of its various sub-components may be a separate and distinct component in accordance with various aspects of the present disclosure. In other examples, feedback manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Feedback manager 815 may receive a first transmission including at least a portion of a first TB, the first TB including a set of CBs transmitted in a first TTI having a first TTI duration. Feedback manager 815 may transmit an indication that a subset of the set of CBs is unsuccessfully received. Feedback manager 815 may receive a retransmission of the subset of CBs in a second TTI having a TTI duration that is selected from the first TTI duration or a second TTI duration that is shorter than the first TTI duration. The feedback manager 815 may also receive an indication that a subset of the set of CBs is unsuccessfully received and transmit a retransmission of the subset of CBs in a second TTI having a TTI duration that is selected from the first TTI duration or a second TTI duration that is shorter than the first TTI duration.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11, or transceiver 1235 described with reference to FIG. 12. The transmitter 820 may include a single antenna, or it may include a set of antennas. Transmitter 820 may transmit a first transmission including at least a portion of a first TB, the TB including a set of CBs transmitted in a first TTI having a first TTI duration. In some cases, the transmitter 820 may transmit a subset of retransmitted CBs in a second TTI having the second TTI duration at least partially concurrently with the transmitting another TB in a third TTI, the third TTI having the first TTI duration.

Figure 9:
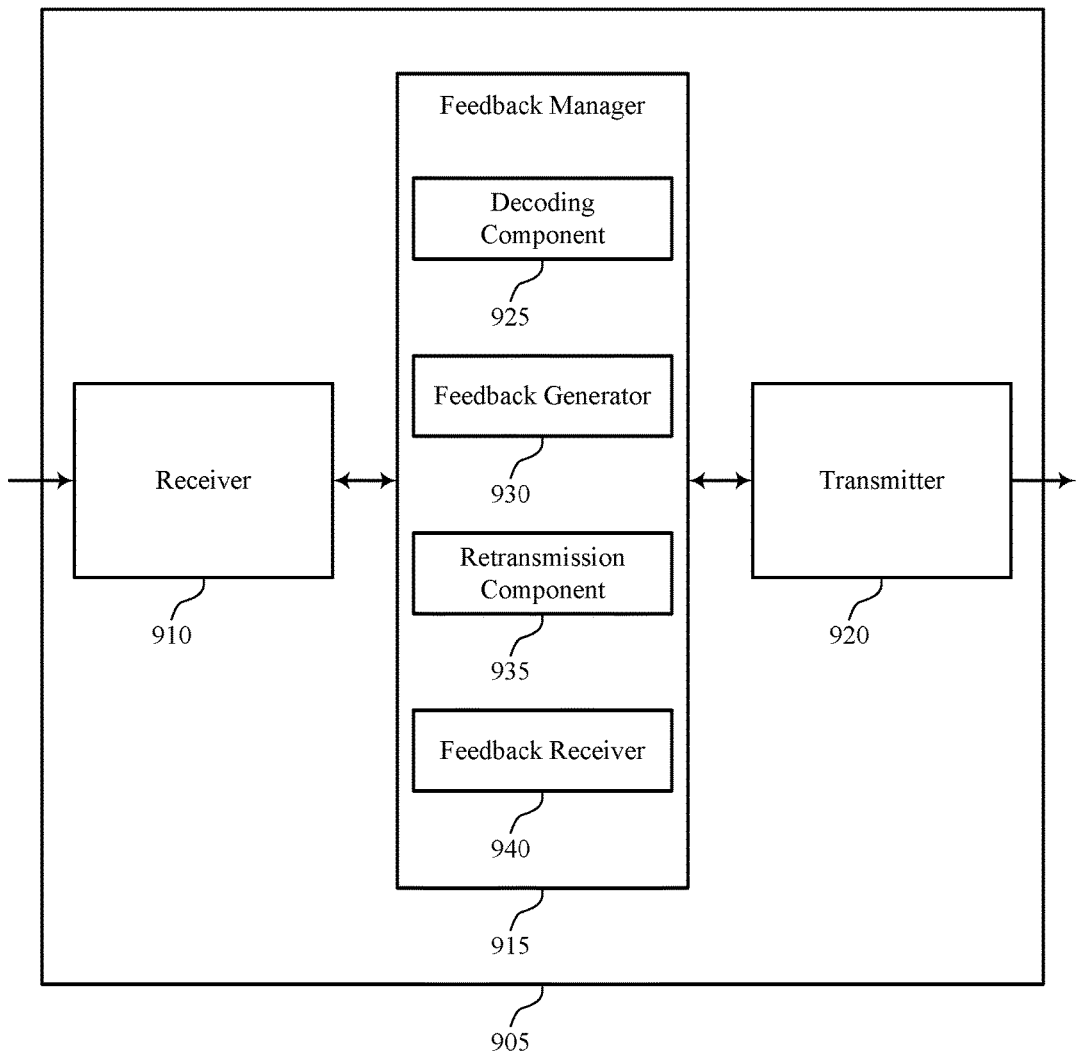

FIG. 9 shows a block diagram 900 of a wireless device 905 that supports feedback-based retransmission using mixed-duration TTIs in accordance with various aspects of the present disclosure. Wireless device 905 may be an example of aspects of a wireless device 805 or a UE 115 or base station 105 as described with reference to FIGS. 1, 2, and 8. Wireless device 905 may include receiver 910, feedback manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to feedback-based retransmission using mixed-duration transmission time intervals, etc.). Information may be passed on to other components of the device. The receiver 910 may be an example of aspects of the transceiver 1135 described with reference to FIG. 11, or transceiver 1235 described with reference to FIG. 12.

Feedback manager 915 may be an example of aspects of the UE feedback manager 1115 described with reference to FIG. 11, or the base station feedback manager 1215 described with reference to FIG. 12. Feedback manager 915 may also include decoding component 925, feedback generator 930, retransmission component 935, and feedback receiver 940.

Decoding component 925 may receive a first transmission including at least a portion of a first TB, the first TB including a set of CBs transmitted in a first TTI having a first TTI duration. In some cases, the second TTI includes only CBs of the first TB. Feedback generator 930 may transmit an indication that a subset of the set of CBs is unsuccessfully received. Retransmission component 935 may receive a retransmission of the subset of CBs in a second TTI having a TTI duration that is selected from the first TTI duration or a second TTI duration that is shorter than the first TTI duration. In some cases, the retransmission component 935 may determine a number of CBs in the subset of CBs to be retransmitted in the second TTI, and the second TTI may include Only the subset of the set of CBs, and not other CBs from another TB.

Feedback receiver 940 may receive an indication that a subset of the set of CBs is unsuccessfully received. Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11, or transceiver 1235 described with reference to FIG. 12. The transmitter 920 may include a single antenna, or it may include a set of antennas.

Figure 10:
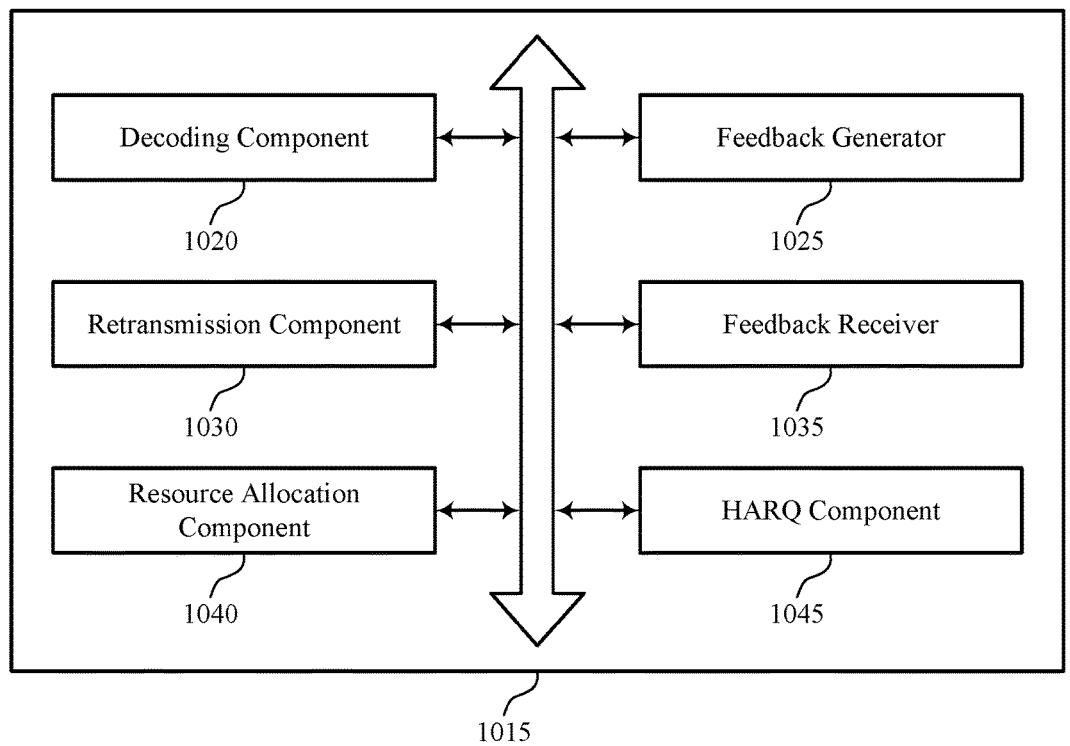

FIG. 10 shows a block diagram 1000 of a feedback manager 1015 that supports feedback-based retransmission using mixed-duration TTIs in accordance with various aspects of the present disclosure. The feedback manager 1015 may be an example of aspects of a feedback manager 815, a feedback manager 915, a UE feedback manager 1115, or a base station feedback manager 1215 described with reference to FIGS. 8, 9, 11, and 12. The feedback manager 1015 may include decoding component 1020, feedback generator 1025, retransmission component 1030, feedback receiver 1035, resource allocation component 1040, and HARQ component 1045. Each of these modules may communicate, directly or indirectly, with one another (e.g., via one or more buses).

Decoding component 1020 may receive a first transmission including at least a portion of a first TB, the first TB including a set of CBs transmitted in a first TTI having a first TTI duration. In some cases, the decoding component 1020 may receive a second transmission including a subset of CBs that are retransmitted in a second TTI. In some cases, the second TTI includes only CBs of the first TB. Feedback generator 1025 may transmit an indication that a subset of the set of CBs is unsuccessfully received.

Retransmission component 1030 may receive a retransmission of the subset of CBs in a second TTI having a TTI duration that is selected from the first TTI duration or a second TTI duration that is shorter than the first TTI duration. In some cases, retransmission component 1030 may transmit, responsive to received feedback, a retransmission of a subset of CBs in a second TTI having a TTI duration that is selected from the first TTI duration or a second TTI duration that is shorter than the first TTI duration. In some cases, a number of CBs in the subset of CBs may be determined to be retransmitted in the second TTI, and the second TTI includes only CBs of the first TB. In some cases the retransmission further includes an indication that the retransmission is responsive to the indication of the subset of CBs, and includes Only the subset of the set of CBs.

Feedback receiver 1035 may receive an indication that a subset of the set of CBs is unsuccessfully received. Resource allocation component 1040 may identify a RB allocation and the second TTI duration of the second TTI from a set of available RB allocations and a set of available TTI durations. In some cases, the feedback manager 1015 may be part of a base station and the resource allocation component 1040 may determine the RB allocation and the second TTI duration based on the number of CBs, and provide control information to a UE indicating the RB allocation and the second TTI duration to be used for the retransmission of the subset of CBs. In some cases, the control information is transmitted in DCI that provides a downlink grant for the retransmission of the subset of CBs. In some cases, the control information is transmitted in DCI that provides an uplink grant for the retransmission of the subset of CBs. In some cases, the feedback manager 1015 may be part of a UE and the resource allocation component 1040 may receive control information that indicates the RB allocation and the second TTI duration.

HARQ component 1045 may perform HARQ processing, and in some cases the retransmission of the subset of CBs has a same HARQ index as the first transmission. In some cases, a same HARQ process is shared between the first TTI having the first TTI duration and the second TTI having the second TTI duration.

Figure 11:
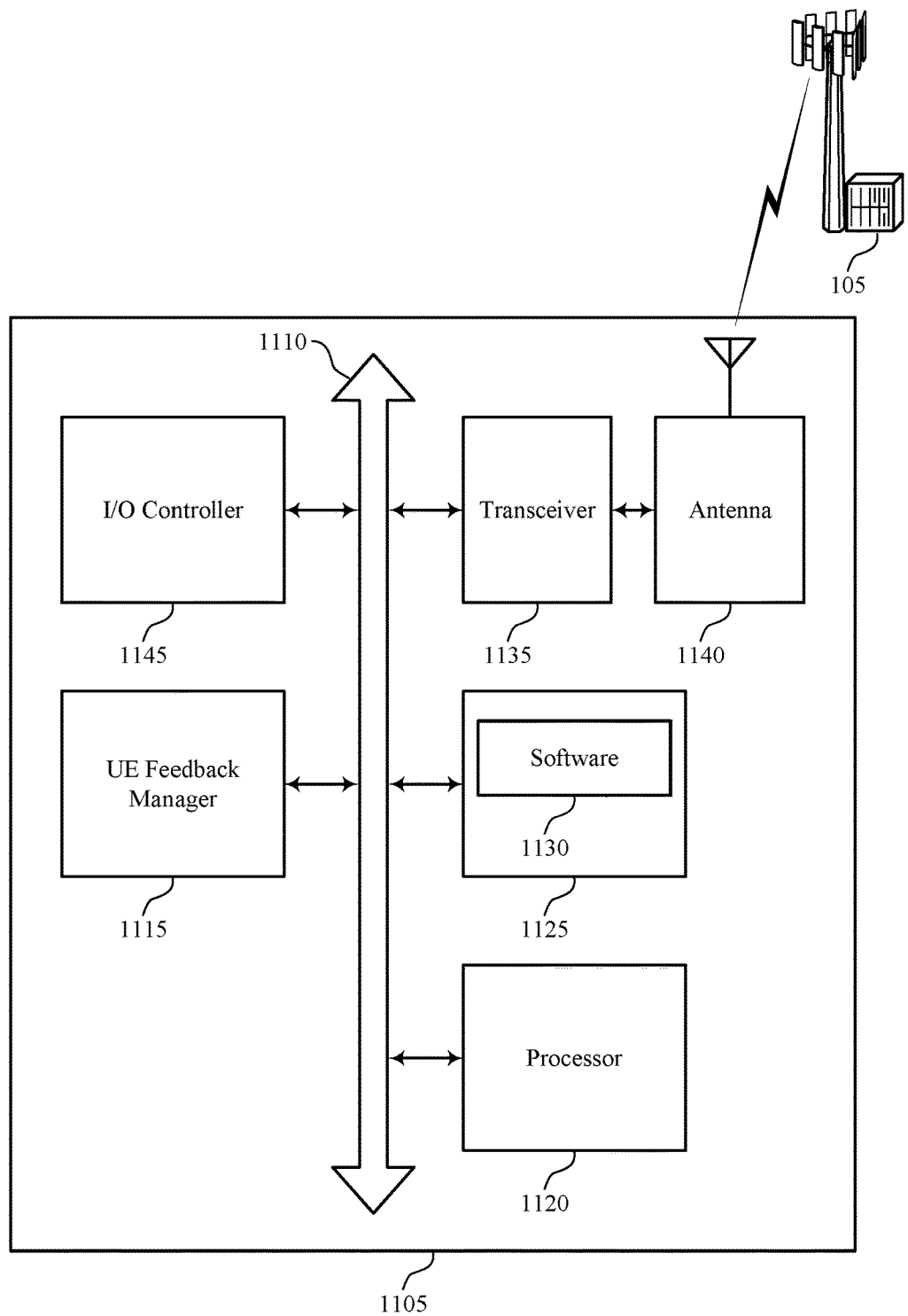
FIG. 11 illustrates a block diagram of a system including a UE that supports feedback-based retransmission using mixed-duration transmission time intervals in accordance with aspects of the present disclosure.

FIG. 11 shows a diagram of a system 1100 including a device 1105 that supports feedback-based retransmission using mixed-duration TTIs in accordance with various aspects of the present disclosure. Device 1105 may be an example of or include the components of wireless device 805, wireless device 905, or a UE 115 as described above, e.g., with reference to FIGS. 1, 8 and 9. Device 1105 may include components for bi-directional voice and data communications including components for transmitting and receiving communications, including UE feedback manager 1115, processor 1120, memory 1125, software 1130, transceiver 1135, antenna 1140, and I/O controller 1145. These components may be in electronic communication via one or more busses (e.g., bus 1110). Device 1105 may communicate wirelessly with one or more base stations 105.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting feedback-based retransmission using mixed-duration transmission time intervals).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware and/or software operation such as the interaction with peripheral components or devices.

Software 1130 may include code to implement aspects of the present disclosure, including code to support feedback-based retransmission using mixed-duration transmission time intervals. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas. In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
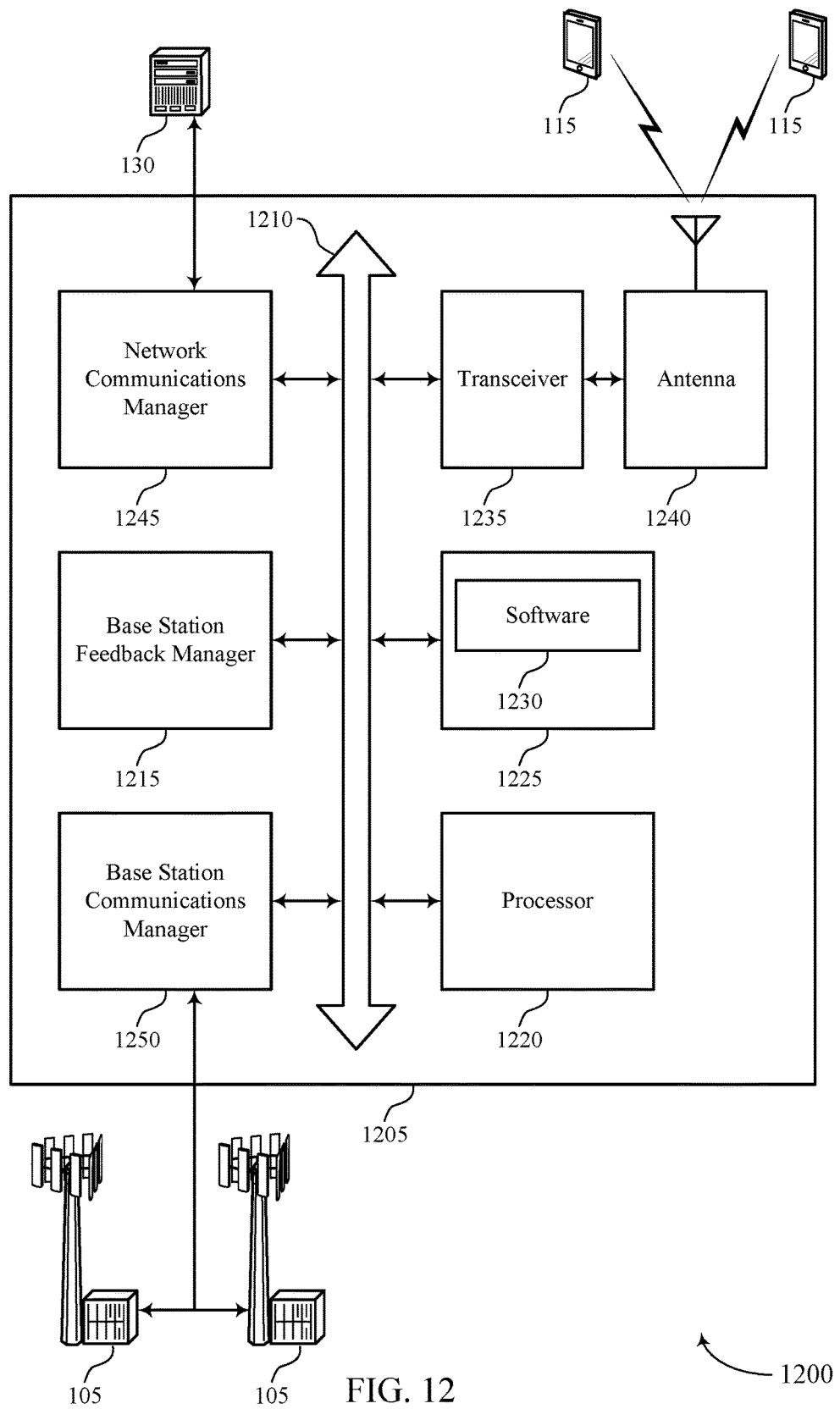
FIG. 12 illustrates a block diagram of a system including a base station that supports feedback-based retransmission using mixed-duration transmission time intervals in accordance with aspects of the present disclosure.

FIG. 12 shows a diagram of a system 1200 including a device 1205 that supports feedback-based retransmission using mixed-duration TTIs in accordance with various aspects of the present disclosure. Device 1205 may be an example of or include the components of wireless device 905, wireless device 1005, or a base station 105 as described above, e.g., with reference to FIGS. 1, 9 and 10. Device 1205 may include components for bi-directional voice and data communications including components for transmitting and receiving communications, including base station feedback manager 1215, processor 1220, memory 1225, software 1230, transceiver 1235, antenna 1240, network communications manager 1245, and base station communications manager 1250. These components may be in electronic communication via one or more busses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting feedback-based retransmission using mixed-duration transmission time intervals).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware and/or software operation such as the interaction with peripheral components or devices.

Software 1230 may include code to implement aspects of the present disclosure, including code to support feedback-based retransmission using mixed-duration transmission time intervals. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions. Network communications manager 1245 may manage communications with the core network 130 (e.g., via one or more wired backhaul links). For example, the network communications manager 1245 may manage the transfer of data communications for client devices, such as one or more UEs 115.

Base station communications manager 1250 may manage communications with other base station 105, and may include a controller or scheduler for controlling communications with UEs 115 in cooperation with other base stations 105. For example, the base station communications manager 1250 may coordinate scheduling for transmissions to UEs 115 for various interference mitigation techniques such as beamforming or joint transmission. In some examples, base station communications manager 1250 may provide an X2 interface within an LTE/LTE-A wireless communication network technology to provide communication between base stations 105.

Figure 13:
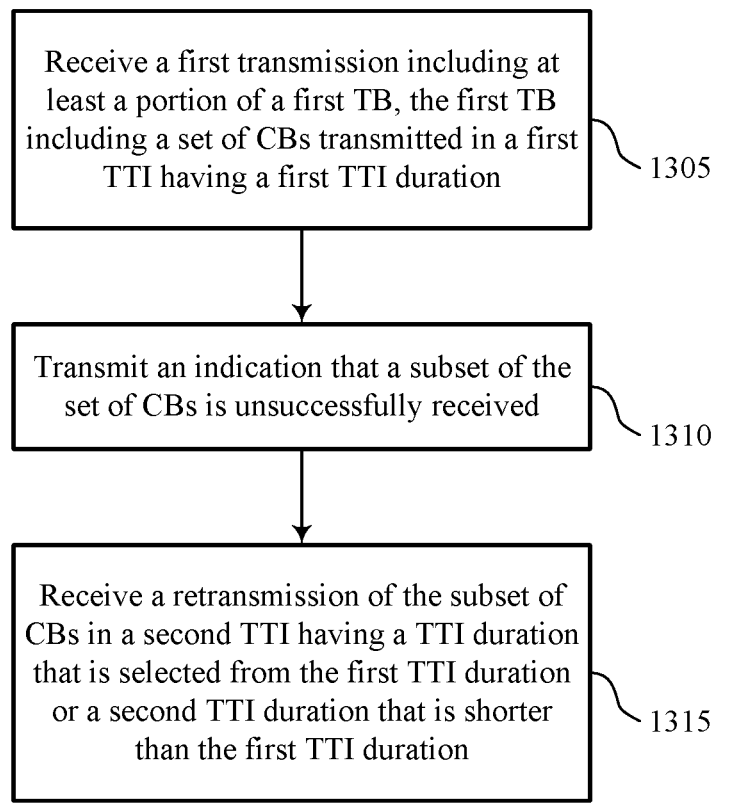
FIGS. 13 through 16 illustrate methods for feedback-based retransmission using mixed-duration transmission time intervals in accordance with aspects of the present disclosure.

FIG. 13 shows a flowchart illustrating a method 1300 for feedback-based retransmission using mixed-duration TTIs in accordance with various aspects of the present disclosure. The operations of method 1300 may be implemented by a UE 115 or base station 105 or its components as described herein. For example, the operations of method 1300 may be performed by a feedback manager as described with reference to FIGS. 8 through 10. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1305, the UE 115 or base station 105 may receive a first transmission comprising at least a portion of a first TB, the first TB comprising a set of CBs transmitted in a first TTI having a first TTI duration. The operations of block 1305 may be performed according to the methods described with reference to FIGS. 1 through 7. In certain examples, aspects of the operations of block 1305 may be performed by a decoding component as described with reference to FIGS. 8 through 10.

At block 1310, the UE 115 or base station 105 may transmit an indication that a subset of the set of CBs is unsuccessfully received. The operations of block 1310 may be performed according to the methods described with reference to FIGS. 1 through 7. In certain examples, aspects of the operations of block 1310 may be performed by a feedback generator as described with reference to FIGS. 8 through 10.

At block 1315, the UE 115 or base station 105 may receive a retransmission of the subset of CBs in a second TTI having a TTI duration that is selected from the first TTI duration or a second TTI duration that is shorter than the first TTI duration. The operations of block 1315 may be performed according to the methods described with reference to FIGS. 1 through 7. In certain examples, aspects of the operations of block 1315 may be performed by a retransmission component as described with reference to FIGS. 8 through 10.

Figure 14:
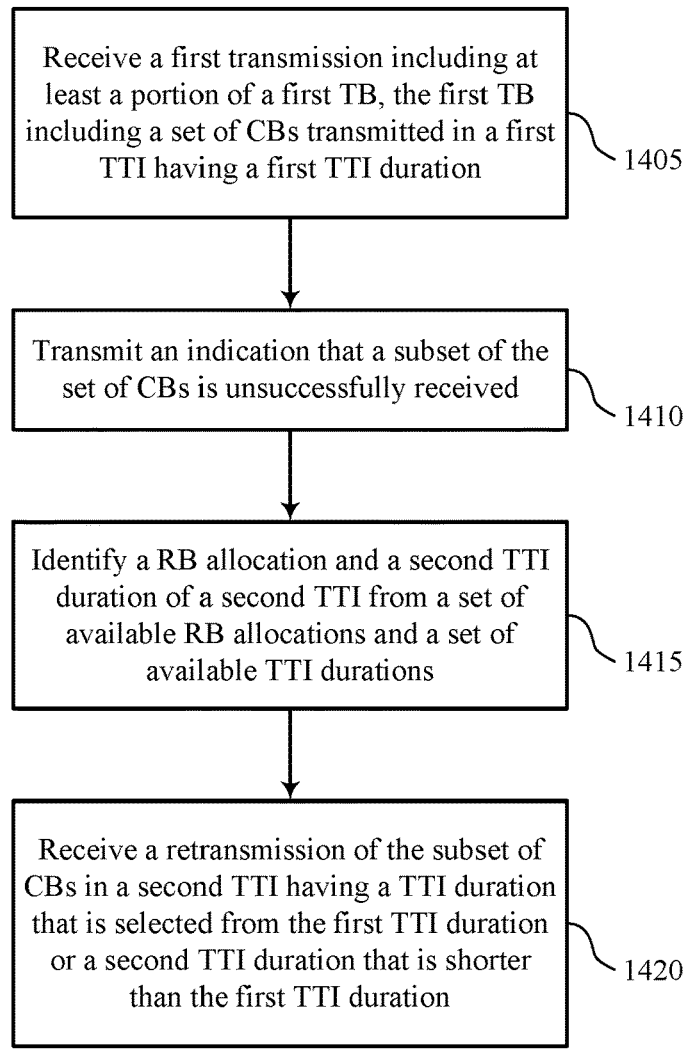

FIG. 14 shows a flowchart illustrating a method 1400 for feedback-based retransmission using mixed-duration transmission time intervals in accordance with various aspects of the present disclosure. The operations of method 1400 may be implemented by a UE 115 or base station 105 or its components as described herein. For example, the operations of method 1400 may be performed by a feedback manager as described with reference to FIGS. 8 through 10. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1405, the UE 115 or base station 105 may receive a first transmission comprising at least a portion of a first TB, the first TB comprising a set of CBs transmitted in a first TTI having a first TTI duration. The operations of block 1405 may be performed according to the methods described with reference to FIGS. 1 through 7. In certain examples, aspects of the operations of block 1405 may be performed by a decoding component as described with reference to FIGS. 8 through 10.

At block 1410, the UE 115 or base station 105 may transmit an indication that a subset of the set of CBs is unsuccessfully received. The operations of block 1410 may be performed according to the methods described with reference to FIGS. 1 through 7. In certain examples, aspects of the operations of block 1410 may be performed by a feedback generator as described with reference to FIGS. 8 through 10.

At block 1415, the UE 115 or base station 105 may identify a RB allocation and a second TTI duration of a second TTI from a set of available RB allocations and a set of available TTI durations. The operations of block 1415 may be performed according to the methods described with reference to FIGS. 1 through 7. In certain examples, aspects of the operations of block 1415 may be performed by a resource allocation component as described with reference to FIGS. 8 through 10.

At block 1420, the UE 115 or base station 105 may receive a retransmission of the subset of CBs in a second TTI having a TTI duration that is selected from the first TTI duration or a second TTI duration that is shorter than the first TTI duration. The operations of block 1420 may be performed according to the methods described with reference to FIGS. 1 through 7. In certain examples, aspects of the operations of block 1420 may be performed by a retransmission component as described with reference to FIGS. 8 through 10.

Figure 15:
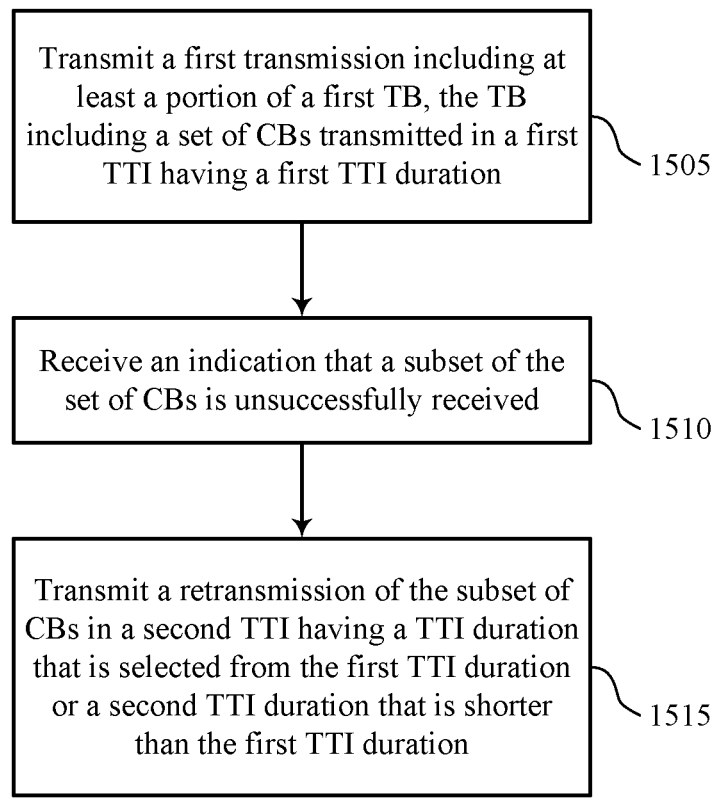

FIG. 15 shows a flowchart illustrating a method 1500 for feedback-based retransmission using mixed-duration transmission time intervals in accordance with various aspects of the present disclosure. The operations of method 1500 may be implemented by a UE 115 or base station 105 or its components as described herein. For example, the operations of method 1500 may be performed by a feedback manager as described with reference to FIGS. 8 through 10. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1505, the UE 115 or base station 105 may transmit a first transmission comprising at least a portion of a first TB, the TB comprising a set of CBs transmitted in a first TTI having a first TTI duration. The operations of block 1505 may be performed according to the methods described with reference to FIGS. 1 through 7. In certain examples, aspects of the operations of block 1505 may be performed by a transmitter as described with reference to FIGS. 8 through 10.

At block 1510, the UE 115 or base station 105 may receive an indication that a subset of the set of CBs is unsuccessfully received. The operations of block 1510 may be performed according to the methods described with reference to FIGS. 1 through 7. In certain examples, aspects of the operations of block 1510 may be performed by a feedback receiver as described with reference to FIGS. 8 through 10.

At block 1515, the UE 115 or base station 105 may transmit a retransmission of the subset of CBs in a second TTI having a TTI duration that is selected from the first TTI duration or a second TTI duration that is shorter than the first TTI duration. The operations of block 1515 may be performed according to the methods described with reference to FIGS. 1 through 7. In certain examples, aspects of the operations of block 1515 may be performed by a retransmission component as described with reference to FIGS. 8 through 10.

Figure 16:
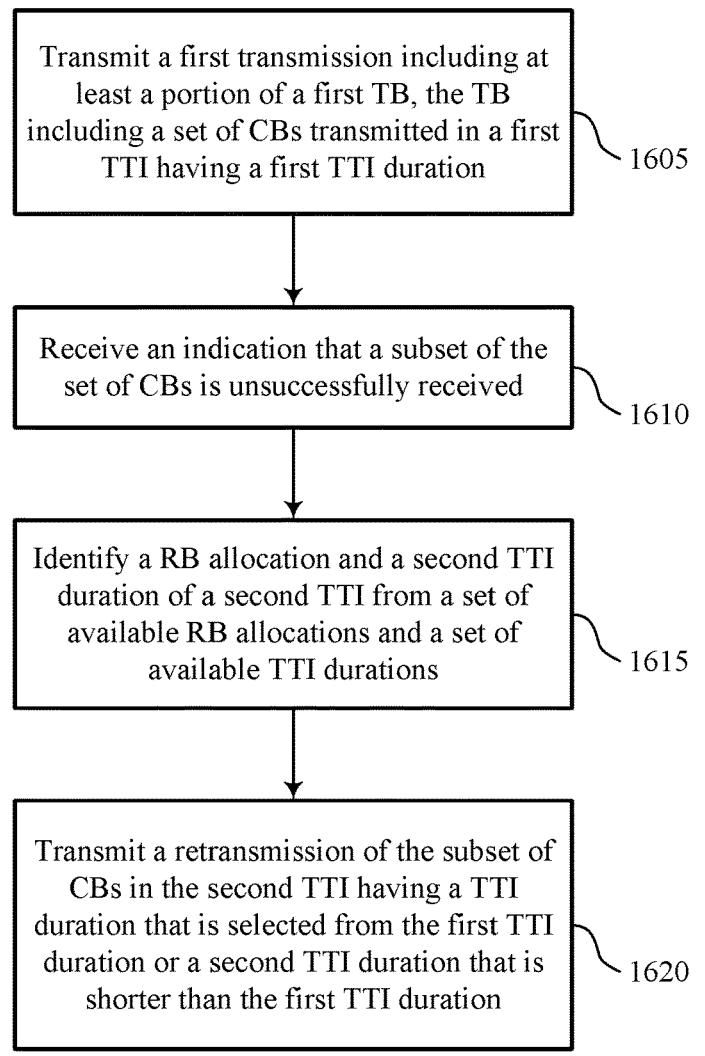

FIG. 16 shows a flowchart illustrating a method 1600 for feedback-based retransmission using mixed-duration transmission time intervals in accordance with various aspects of the present disclosure. The operations of method 1600 may be implemented by a UE 115 or base station 105 or its components as described herein. For example, the operations of method 1600 may be performed by a feedback manager as described with reference to FIGS. 8 through 10. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1605, the UE 115 or base station 105 may transmit a first transmission comprising at least a portion of a first TB, the TB comprising a set of CBs transmitted in a first TTI having a first TTI duration. The operations of block 1605 may be performed according to the methods described with reference to FIGS. 1 through 7. In certain examples, aspects of the operations of block 1605 may be performed by a transmitter as described with reference to FIGS. 8 through 10.

At block 1610, the UE 115 or base station 105 may receive an indication that a subset of the set of CBs is unsuccessfully received. The operations of block 1610 may be performed according to the methods described with reference to FIGS. 1 through 7. In certain examples, aspects of the operations of block 1610 may be performed by a feedback receiver as described with reference to FIGS. 8 through 10.

At block 1615, the UE 115 or base station 105 may identify a RB allocation and a second TTI duration of a second TTI from a set of available RB allocations and a set of available TTI durations. The operations of block 1615 may be performed according to the methods described with reference to FIGS. 1 through 7. In certain examples, aspects of the operations of block 1615 may be performed by a resource allocation component as described with reference to FIGS. 8 through 10.

At block 1620, the UE 115 or base station 105 may transmit a retransmission of the subset of CBs in the second TTI having a TTI duration that is selected from the first TTI duration or a second TTI duration that is shorter than the first TTI duration. The operations of block 1620 may be performed according to the methods described with reference to FIGS. 1 through 7. In certain examples, aspects of the operations of block 1620 may be performed by a retransmission component as described with reference to FIGS. 8 through 10.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term eNB may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving, at a receiver of a first wireless device, a first transmission from a second wireless device, the first transmission comprising at least a portion of a first transport block (TB), the first TB comprising a set of code blocks (CBs) transmitted in a first transmission time interval (TTI) having a first TTI duration;
   transmitting, by a transmitter of the first wireless device to the second wireless device, an indication that a subset of the set of CBs is unsuccessfully received; and
   receiving, at the receiver, a retransmission from the second wireless device, the retransmission comprising the subset of the set of CBs in a second TTI having a TTI duration that is selected from the first TTI duration or a second TTI duration that is shorter than the first TTI duration.

2. The method of claim 1, wherein the second TTI includes only the subset of the set of CBs of the first TB.

3. The method of claim 1, further comprising:
   receiving, at least partially concurrently with the receiving the retransmission of the subset of the set of CBs, a second transmission comprising at least a portion of a second TB in a third TTI, the third TTI having the first TTI duration.

4. The method of claim 1, further comprising:
   identifying a resource block (RB) allocation and the second TTI duration of the second TTI from a set of available RB allocations and a set of available TTI durations.

5. The method of claim 4, wherein the first wireless device is a base station, and wherein the identifying comprises:
   determining a number of CBs in the subset of the set of CBs to be retransmitted in the second TTI;
   determining the RB allocation and the second TTI duration based at least in part on the number of CBs; and
   transmitting control information to a user equipment (UE) indicating the RB allocation and the second TTI duration to be used for the retransmission of the subset of the set of CBs.

6. The method of claim 5, wherein the control information is transmitted in downlink control information (DCI) that provides an uplink grant for the retransmission of the subset of the set of CBs.

7. The method of claim 4, wherein the first wireless device is a user equipment (UE), and wherein the identifying comprises:
   receiving control information that indicates the RB allocation and the second TTI duration.

8. The method of claim 7, wherein the control information is received in downlink control information (DCI) that provides a downlink grant for the retransmission of the subset of the set of CBs.

9. The method of claim 1, wherein the receiving the retransmission further comprises:
   receiving an indication that the retransmission is responsive to the indication of the subset of the set of CBs and includes only the subset of the set of CBs, or that the retransmission includes the set of CBs.

10. The method of claim 1, wherein the retransmission of the subset of the set of CBs has a same hybrid automatic repeat request (HARQ) index as the first transmission.

11. The method of claim 10, wherein a same HARQ process is shared between the first TTI having the first TTI duration and the second TTI having the first TTI duration or the second TTI duration.

12. A method for wireless communication, comprising:
transmitting, at a transmitter of a first wireless device, a first transmission to a second wireless device, the first transmission comprising at least a portion of a first transport block (TB), the TB comprising a set of code blocks (CBs) transmitted in a first transmission time interval (TTI) having a first TTI duration;
receiving, at a receiver of the first wireless device, an indication that a subset of the set of CBs is unsuccessfully received; and
transmitting, by the transmitter, a retransmission to the second wireless device of the subset of the set of CBs in a second TTI having a TTI duration that is selected from the first TTI duration or a second TTI duration that is shorter than the first TTI duration.

13. The method of claim 12, wherein the second TTI includes only the subset of the set of CBs of the first TB.

14. The method of claim 12, further comprising:
transmitting, at least partially concurrently with the transmitting the retransmission of the subset of the set of CBs, a second transmission comprising at least a portion of a second TB in a third TTI, the third TTI having the first TTI duration.

15. The method of claim 12, further comprising:
identifying a resource block (RB) allocation and the second TTI duration of the second TTI from a set of available RB allocations and a set of available TTI durations.

16. The method of claim 15, wherein the first wireless device is a base station, and wherein the identifying comprises:
determining a number of CBs in the subset of the set of CBs to be retransmitted in the second TTI;
determining the RB allocation and the second TTI duration based at least in part on the number of CBs; and
transmitting control information to a user equipment (UE) indicating the RB allocation and the second TTI duration to be used for the retransmission of the subset of the set of CBs.

17. The method of claim 16, wherein the control information is transmitted in downlink control information (DCI) that provides a downlink grant for the retransmission of the subset of the set of CBs.

18. The method of claim 15, wherein the first wireless device is a user equipment (UE), and wherein the identifying comprises:
receiving control information that indicates the RB allocation and the second TTI duration.

19. The method of claim 18, wherein the control information is transmitted in downlink control information (DCI) that provides an uplink grant for the retransmission of the subset of the set of CBs.

20. The method of claim 12, wherein the transmitting the retransmission further comprises:
transmitting an indication that the retransmission is responsive to the indication of the subset of the set of CBs, and includes only the subset of the set of CBs.

21. The method of claim 12, wherein the retransmission of the subset of the set of CBs has a same hybrid automatic repeat request (HARQ) index as the first transmission.

22. The method of claim 21, wherein a same HARQ process is shared between the first TTI having the first TTI duration and the second TTI having the first TTI duration or the second TTI duration.

23. An apparatus for wireless communication, in a system comprising:
a processor;
memory in electronic communication with the processor; and
instructions stored in the memory and operable, when executed by the processor, to cause the apparatus to:
receive, at a receiver of a first wireless device, a first transmission from a second wireless device, the first transmission comprising at least a portion of a first TB, the first TB comprising a set of CBs transmitted in a first TTI having a first TTI duration;
transmit, by a transmitter of the first wireless device to the second wireless device, an indication that a subset of the set of CBs is unsuccessfully received; and
receive, at the receiver, a retransmission from the second wireless device, the retransmission comprising the subset of the set of CBs in a second TTI having a TTI duration that is selected from the first TTI duration or a second TTI duration that is shorter than the first TTI duration.

24. The apparatus of claim 23, wherein the second TTI includes only the subset of the set of CBs of the first TB.

25. The apparatus of claim 23, wherein the instructions are further executable by the processor to:
receive, at least partially concurrently with the receiving the retransmission of the subset of the set of CBs, a second transmission comprising at least a portion of a second TB in a third TTI, the third TTI having the first TTI duration.

26. The apparatus of claim 23, wherein the retransmission of the subset of the set of CBs has a same hybrid automatic repeat request (HARQ) index as the first transmission.

27. An apparatus for wireless communication, in a system comprising:
a processor;
memory in electronic communication with the processor; and
instructions stored in the memory and operable, when executed by the processor, to cause the apparatus to:
transmit, at a transmitter of a first wireless device, a first transmission to a second wireless device, the first transmission comprising at least a portion of a first TB, the TB comprising a set of CBs transmitted in a first TTI having a first TTI duration;
receive, at a receiver of the first wireless device, an indication that a subset of the set of CBs is unsuccessfully received; and
transmit, by the transmitter, a retransmission to the second wireless device of the subset of the set of CBs in a second TTI having a TTI duration that is selected from the first TTI duration or a second TTI duration that is shorter than the first TTI duration.

28. The apparatus of claim 27, wherein the second TTI includes only the subset of the set of CBs of the first TB.

29. The apparatus of claim 27, wherein the instructions are further executable by the processor to:
transmit, at least partially concurrently with the receiving the retransmission of the subset of the set of CBs, a second transmission comprising at least a portion of a second TB in a third TTI, the third TTI having the first TTI duration.

30. The apparatus of claim 27, wherein the retransmission of the subset of the set of CBs has a same hybrid automatic repeat request (HARQ) index as the first transmission.

* * * * *